US008268073B2

(12) United States Patent
Kunik et al.

(10) Patent No.: US 8,268,073 B2
(45) Date of Patent: *Sep. 18, 2012

(54) SYSTEM AND METHOD FOR MAKING CEMENT AND CEMENT DERIVED THEREFROM

(75) Inventors: Burton J. Kunik, Houston, TX (US); James C. Berns, Carthage, TX (US); David G. Gossman, Zwingle, IA (US)

(73) Assignee: Sharps Compliance, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/649,230

(22) Filed: Dec. 29, 2009

(65) Prior Publication Data

US 2011/0155020 A1  Jun. 30, 2011

(51) Int. Cl.
| | | |
|---|---|---|
| *C04B 2/10* | (2006.01) | |
| *C04B 7/45* | (2006.01) | |
| *C04B 11/036* | (2006.01) | |
| *F23G 5/00* | (2006.01) | |
| *C10L 11/00* | (2006.01) | |
| *C10L 5/12* | (2006.01) | |
| *A61L 2/04* | (2006.01) | |
| *B01J 7/00* | (2006.01) | |

(52) U.S. Cl. ........ 106/745; 106/756; 106/769; 422/305; 44/532; 44/580; 110/346

(58) Field of Classification Search .......... 106/745, 106/756, 769; 44/532, 580; 422/305; 110/346
See application file for complete search history.

(56) References Cited

U.S. PATENT DOCUMENTS

| | | | | |
|---|---|---|---|---|
| 2,454,353 | A | * | 11/1948 | Steele ............................. 30/339 |
| 4,395,265 | A | | 7/1983 | Reilly et al. |
| 4,529,407 | A | | 7/1985 | Johnston et al. |
| 4,822,379 | A | * | 4/1989 | Thompson ....................... 44/589 |
| 4,921,538 | A | * | 5/1990 | Lafser et al. ................... 106/745 |
| 5,106,594 | A | * | 4/1992 | Held et al. ..................... 422/292 |
| 5,173,257 | A | | 12/1992 | Pearson |
| 5,188,649 | A | | 2/1993 | Macedo et al. |

(Continued)

FOREIGN PATENT DOCUMENTS

JP  10263022 A  10/1998

(Continued)

OTHER PUBLICATIONS

"The Dangers of Toxic Metals". Dec. 12, 2004 [Retrieved on Jan. 9, 2012]. Retrieved from http://web.archive.org/web/20041212035406/http://www.drlwilson.com/Articles/TOXIC%20METALS.htm.*

*Primary Examiner* — Anthony J Green
*Assistant Examiner* — Karam Hijji
(74) *Attorney, Agent, or Firm* — Robert W. Strozier

(57) ABSTRACT

Integrated cement production systems and methods implementing the systems are disclosed, where the integrated cement production systems include a burnable fuel supply subsystem, a cement raw material supply subsystem, a kiln subsystem and a cement clinker composition storage subsystem. The burnable fuel supply subsystem is adapted to receive one or a plurality of used and/or unused healthcare materials. The burnable fuel supply subsystem can feed the materials directly into the kiln subsystem, can convert the materials into different form and feed the different form to the kiln subsystem or feed a combination of the materials, different forms and optionally conventional fuels to the kiln subsystem.

25 Claims, 35 Drawing Sheets

U.S. PATENT DOCUMENTS

| | | | |
|---|---|---|---|
| 5,223,231 A | | 6/1993 | Drake |
| 5,265,545 A | | 11/1993 | Milner |
| 5,269,472 A | * | 12/1993 | Koenig .................... 241/33 |
| 5,270,000 A | | 12/1993 | Goldner et al. |
| 5,340,536 A | * | 8/1994 | Datar et al. .................... 422/23 |
| 5,342,418 A | | 8/1994 | Jesse |
| 5,643,342 A | | 7/1997 | Andrews |
| 5,830,419 A | | 11/1998 | Held et al. |
| 5,833,922 A | | 11/1998 | Held et al. |
| 5,837,171 A | | 11/1998 | Danzik et al. |
| 5,888,256 A | * | 3/1999 | Morrison .................... 44/552 |
| 6,045,070 A | | 4/2000 | Davenport |
| 6,344,638 B1 | | 2/2002 | Tomasello |
| 6,506,223 B2 | | 1/2003 | White |
| 6,635,093 B1 | | 10/2003 | Schoen et al. |
| 7,032,322 B1 | | 4/2006 | Smith |
| 7,565,299 B2 | | 7/2009 | Mallett et al. |
| 2006/0096163 A1 | | 5/2006 | Dickinson et al. |
| 2008/0029444 A1 | | 2/2008 | Mallett et al. |
| 2008/0073251 A1 | | 3/2008 | Reshamwala et al. |
| 2008/0247904 A1 | | 10/2008 | Paskalov |
| 2009/0283015 A1 | | 11/2009 | Gasser et al. |

FOREIGN PATENT DOCUMENTS

| | | |
|---|---|---|
| JP | 10263023 A | 10/1998 |

* cited by examiner

SYSTEM AND METHOD FOR MAKING CEMENT AND CEMENT DERIVED THEREFROM

RELATED APPLICATIONS

This application is related to U.S. patent application Ser. No. 12/610,331 now U.S. Pat. No. 8,100,989, filed 1 Nov. 2009 (Nov. 1, 2009) and U.S. patent application Ser. No. 12/649,215, filed Dec. 29, 2009 (Dec. 29, 2009). These applications are incorporated herein by reference as set forth in the closing paragraph of the specification, that closing paragraph operable to incorporate by reference all articles, patents or applications to the full extent allowed by the Law of the United States and for the purposes set forth therein.

BACKGROUND OF THE INVENTION

1. Field of the Invention

Embodiments of this invention relate to systems and methods for making cement and to cement compositions derived therefrom.

More particularly, embodiments of the present invention relate to systems and methods for making cement and to cement compositions derived therefrom, where the system includes a cement raw material supply subsystem, a burnable fuel supply subsystem, a cement kiln subsystem, and a cement storage and distribution subsystem. Embodiments of the systems of this invention integrate a healthcare materials (used or unused) supply and conditioning subsystem into a traditional cement subsystem so that healthcare materials (used or unused) can be directly used as a fuel and/or a raw material in the cement production.

2. Description of the Related Art

Cement clinker is produced by feeding a mix of raw materials, such as limestone and silica-containing materials, into a high temperature rotating kiln. Generally, crushed raw materials are stored on site at a cement plant in raw material storage facilities, such as a raw material silo or other suitable storage means. In addition to limestone, raw materials may include clay and sand, as well as other sources of calcium, silicon, aluminum, iron, and other elements. Raw material sources may be transported from a nearby quarry or other sources.

The various raw material components are fed by a raw material feeder into a grinding and mixing facility, such as a raw mill. Raw material components may also be fed directly to a rotating kiln. The final composition of the raw mix depends on the composition and proportion of the individual raw material components. The proportion of the raw material components in the raw mix depends on the rate at which each component is fed into the raw mill or into the kiln.

The raw mix is heated in the rotating kiln, where it becomes partially molten and forms clinker minerals, or cement clinker. The cement clinker then exits the kiln and is rapidly cooled. The cooler may include a grate that is cooled by forced air, or other suitable heat exchanging means.

Clinker kiln dust may be emitted from the kiln and from the cooler, along with exhaust emissions. For example, clinker kiln dust may become suspended in the forced air used to cool the clinker exiting the kiln. The forced air may be filtered and reclaimed clinker kiln dust from the filter may be fed back into the kiln system as a raw material input.

Fuels such as coal and petroleum coke are used to feed the kiln flame to heat the raw mix in the kiln. Other fuels may include whole tires, tire chips, or other alternative fuels such as liquid wastes and plastics and fuels disclosed in co-pending U.S. patent application Ser. No. 12/610,331, filed 1 Nov. 2009 (Nov. 1, 2009). Fuels may be stored at the cement plant in fuel storage containers, and fed into a fuel mill via a fuel feeder. Gaseous fuels, such as natural gas, may also be used as fuel. Gaseous fuels may be piped to the kiln, and regulated by valves or other suitable flow regulation means. A quality control operator generally monitors the rates at which fuels and raw materials are fed to the kiln.

The composition and properties of the raw materials and fuels determine the final composition of the cement clinker, and contribute to the overall efficiency of the cement system. For example, the raw materials and fuels each have a certain moisture percentage, indicative of the amount of water present. Further, the raw materials each have an associated loss factor. The loss factor is indicative of the amount of water, CO, and organic matter that exits the raw material as it reaches the high kiln temperatures. Each fuel has an associated heat value and ash factor. The heat value is indicative of the amount of heat the fuel will produce in the kiln. The ash factor is indicative of the amount of fuel ash passed through from the fuel to the final cement clinker composition.

While many cement plants, systems and methods for making cement have been implemented and are currently being developed, there is a need in the art for cement plants, systems and methods for making cement that integrate a subsystem adapted to receive and convert used healthcare materials into a burnable fuel for cement production.

SUMMARY OF THE INVENTION

Embodiments of this invention relate to systems for preparing cement including a cement raw material supply and conditioning subsystem, a burnable fuel supply subsystem, a kiln subsystem, and a cement storage and distribution subsystem. The burnable fuel supply subsystem is adapted to receive healthcare materials (used and/or unused) to produce an input burnable fuel having a desired component makeup. The burnable fuel supply subsystem may also be adapted to pre-process all or a portion of the healthcare materials (used and/or unused) and/or the input burnable fuel to produce a pre-processed burnable fuel. The burnable fuel supply subsystem may also be adapted to size or size and partially or completely homogenize all or a portion of the initial burnable fuel and/or the pre-processed burnable fuel to form a composite burnable fuel comprising a particulate burnable fuel component and optionally the input burnable fuel and/or the pre-processed burnable fuel. The burnable fuel supply subsystem may also be adapted to shape all or a portion of the particulate burnable fuel into a compact shape to form a shaped burnable fuel. The input burnable fuel, the pre-processed burnable fuel, the particulate burnable fuel and/or the shaped burnable fuel are then supplied to the kiln subsystem as a sole fuel or a component fuel. The burnable fuel supply subsystem can also include sources of conventional gas, liquid or solid fuels such as coal, coke, natural gas, liquid hydrocarbons or other conventional fuels and include supply components for supplying the conventional fuels to the kiln subsystem.

Embodiments of this invention relate to methods for making cement including supplying a cement raw material to a kiln subsystem, where all or a portion of the cement raw material is conditioned prior to introducing the raw cement material it to the kiln subsystem. The methods also include forming an input burnable fuel from one or a plurality of healthcare materials (used and/or unused) in a burnable fuel subsystem. The methods also include supplying the input burnable fuel and optionally a conventional fuel to the kiln subsystem. The methods also include heating and sintering the cement raw material and the fuel ash into a cement clinker composition in the kiln subsystem using the fuel supplied to the kiln subsystem by the burnable fuel subsystem. The methods can also include conditioning all or a portion of the cement raw material to form a conditioned raw material, all of which is supplied to the kiln subsystem to produce the cement clinker composition. The methods can also include pre-processing all or a portion of the input burnable fuel to form a pre-processed burnable fuel. The methods can also include sizing all or a portion of the input burnable fuel and/or the pre-processed burnable fuel in a sizing or sizing and partially or completely homogenizing subsystem to form a particulate burnable fuel. The methods can also include shaping all or a portion of the particulate burnable fuel into a shaped burnable fuel. The methods can also include containerizing the particulate burnable fuel and/or the shaped burnable fuel prior to supplying the fuel to the kiln subsystem. The methods also include supplying a burnable fuel to the kiln subsystem, where the burnable fuel comprises the input burnable fuel, the pre-processed burnable fuel, the particulate burnable fuel, the shaped burnable fuel, the containerized particulate burnable fuel and/or containerized shaped burnable fuel, in any mixture or combination, and where the burning of the mixture is adapted to supply sufficient heat for proper kiln operation and where the resulting ash contributes advantageously to the resulting cement clinker composition.

Embodiments of this invention relate to systems and methods for making cement and to cement compositions derived therefrom, where the system includes a raw material supply and conditioning subsystem, a burnable fuel supply subsystem, a kiln subsystem, and a cement storage and distribution subsystem. The burnable fuel supply subsystem takes in one or a plurality of healthcare materials (used and/or unused) to form an input burnable fuel. The burnable fuel supply subsystem optionally pre-processes all or a portion of the input burnable fuel to form a pre-processed burnable fuel. The burnable fuel supply subsystem optionally sizes or sizes and partially or completely homogenizes all or a portion of the input burnable fuel or the pre-processed burnable fuel to form a particulate burnable fuel. The burnable fuel supply subsystem optionally shapes the all or a portion of the particulate burnable fuel into a shaped burnable fuel. In certain embodiments, the burnable fuel supply subsystem supplies a mixture of the burnable fuels to the kiln subsystem, where the mixture can be the input burnable fuel, the pre-processed burnable fuel, the particulate burnable fuel, the shaped burnable fuel, the containerized particulate burnable fuel, and/or the containerized shaped material, and optionally one or more tradition fuels.

BRIEF DESCRIPTION OF THE DRAWINGS

The invention can be better understood with reference to the following detailed description together with the appended illustrative drawings in which like elements are numbered the same.

Cement Production Systems

Basic Burnable Fuel Supply Subsystem

Figure 2A:
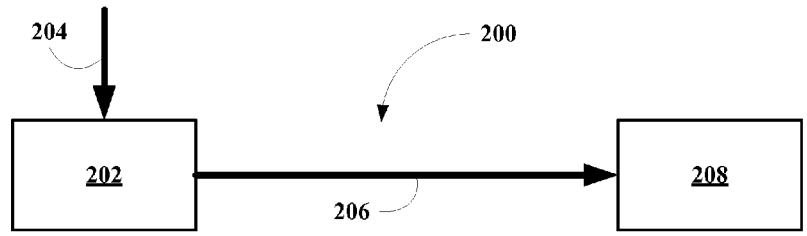

FIG. 2A depicts an embodiment of a basic burnable fuel supply subsystem of this invention.

Figure 2B:
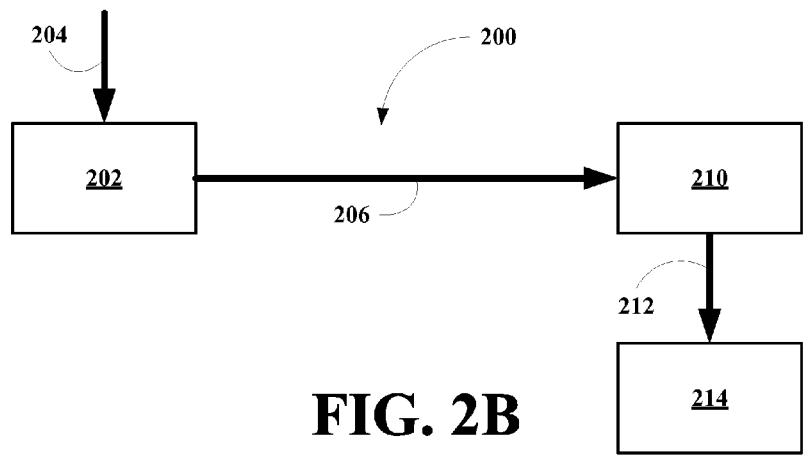

FIG. 2B depicts another embodiment of a basic burnable fuel supply subsystem of this invention.

Figure 2C:
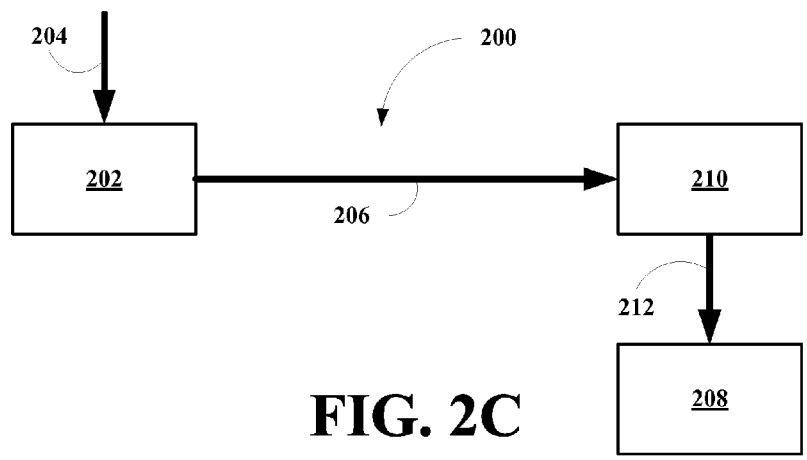

FIG. 2C depicts another embodiment of a basic burnable fuel supply subsystem of this invention.

Figure 2D:
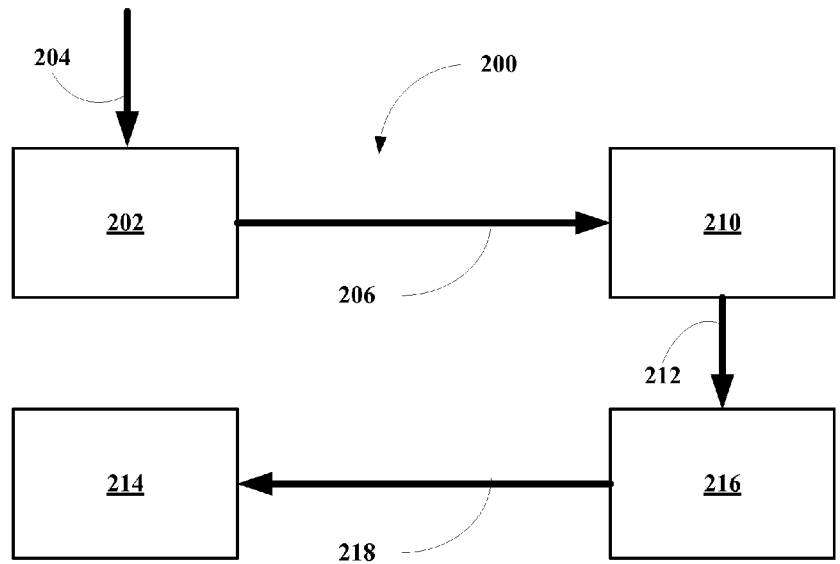

FIG. 2D depicts another embodiment of a basic burnable fuel supply subsystem of this invention.

Figure 2E:
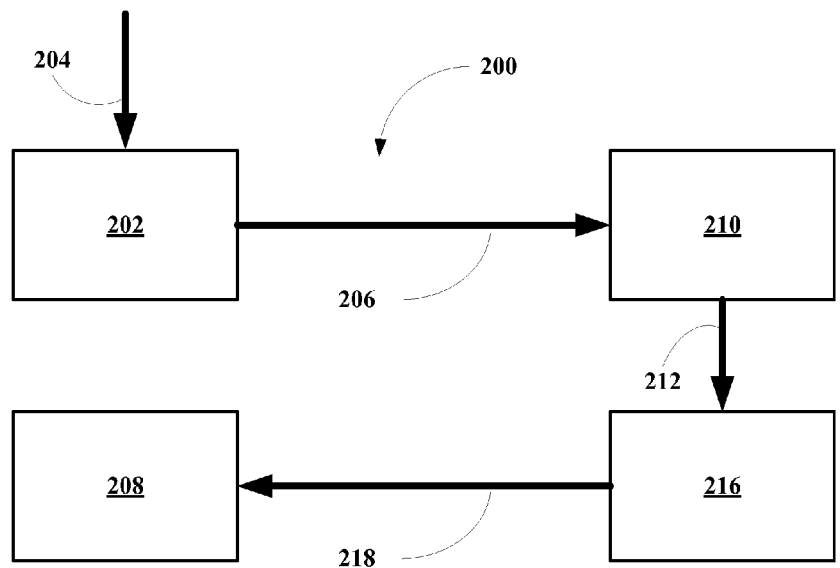

FIG. 2E depicts another embodiment of a basic burnable fuel supply subsystem of this invention.

Figure 2F:
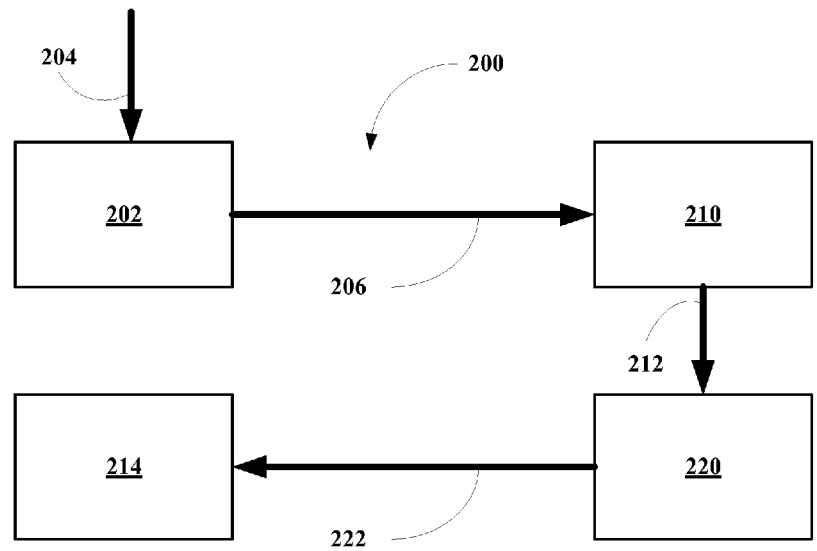

FIG. 2F depicts another embodiment of a basic burnable fuel supply subsystem of this invention.

Figure 2G:
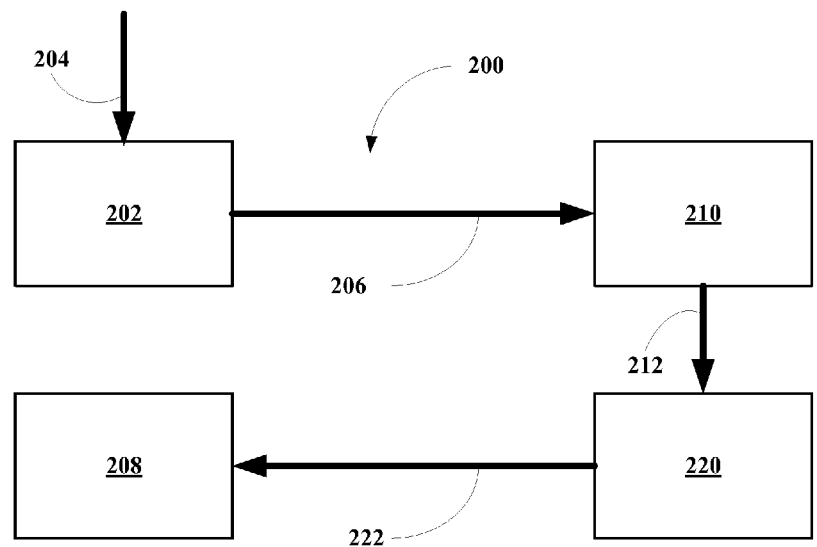

FIG. 2G depicts another embodiment of a basic burnable fuel supply subsystem of this invention.

Figure 2H:
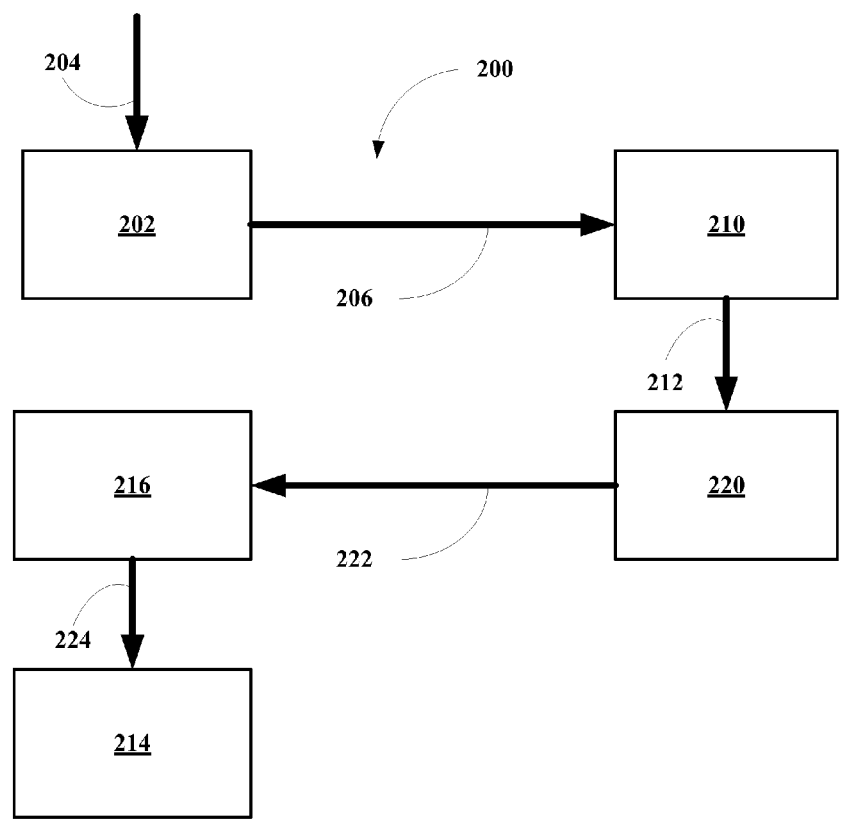

FIG. 2H depicts another embodiment of a basic burnable fuel supply subsystem of this invention.

Figure 2I:
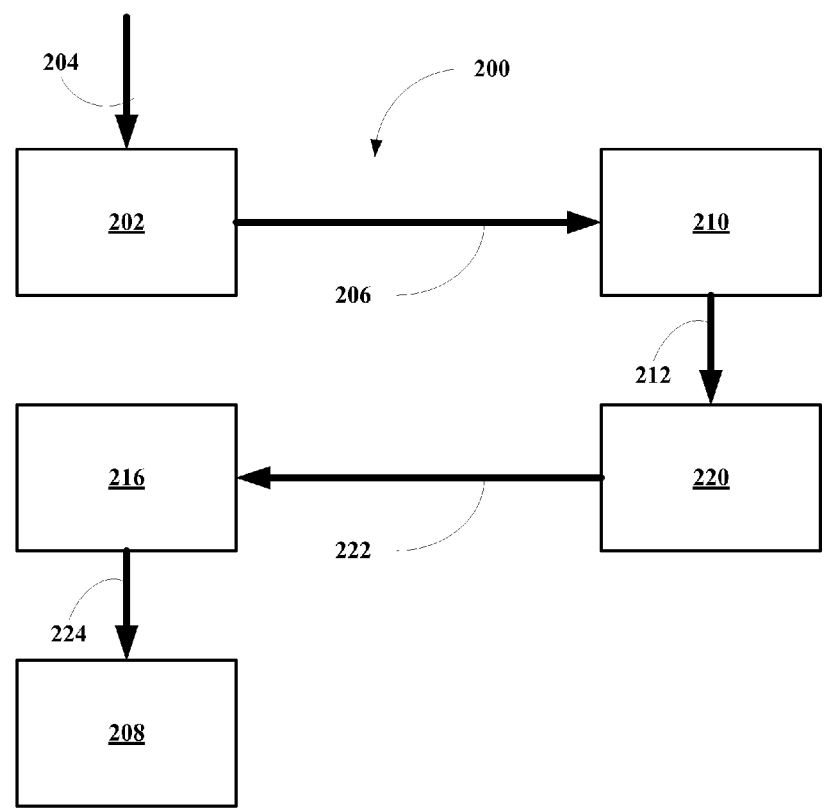

FIG. 2I depicts another embodiment of a basic burnable fuel supply subsystem of this invention.

Burnable Fuel Supply Subsystem Including Pre-Processing Subsystem

Figure 3A:
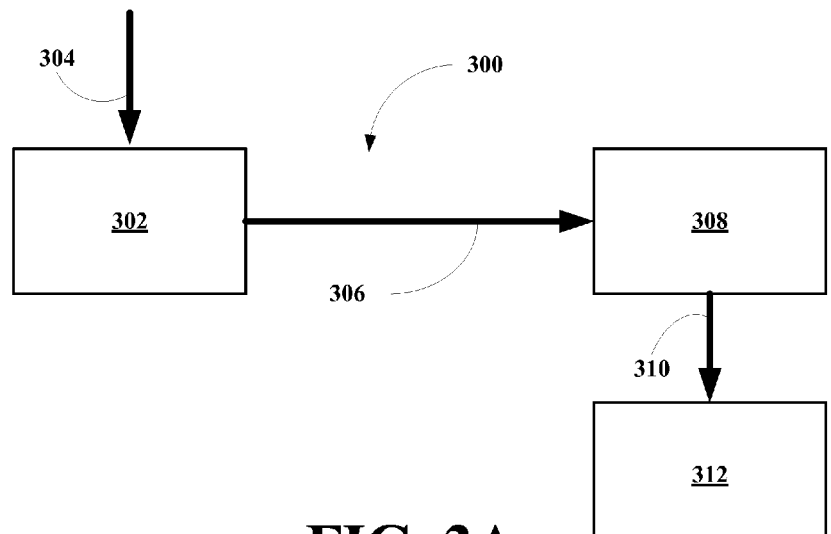

FIG. 3A depicts an embodiment of a burnable fuel supply subsystem including a pre-processing subsystem of this invention.

Figure 3B:
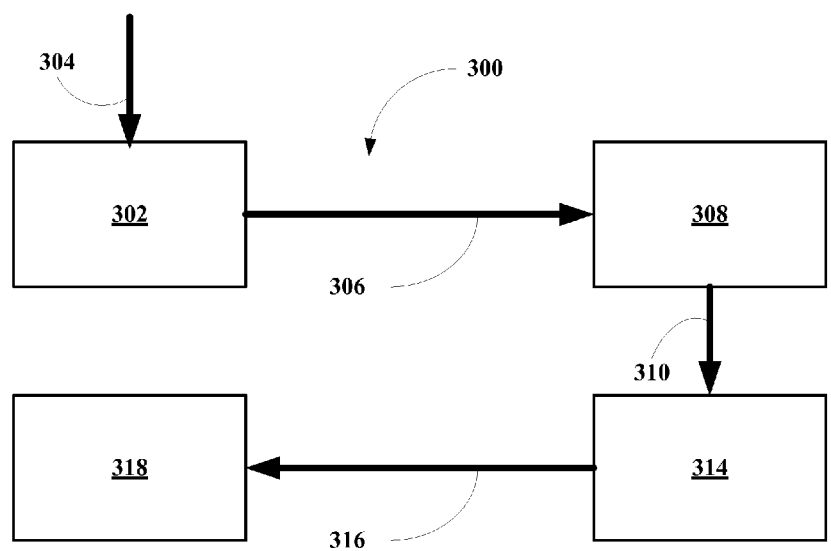

FIG. 3B depicts another embodiment of a burnable fuel supply subsystem including a pre-processing subsystem of this invention.

Figure 3C:
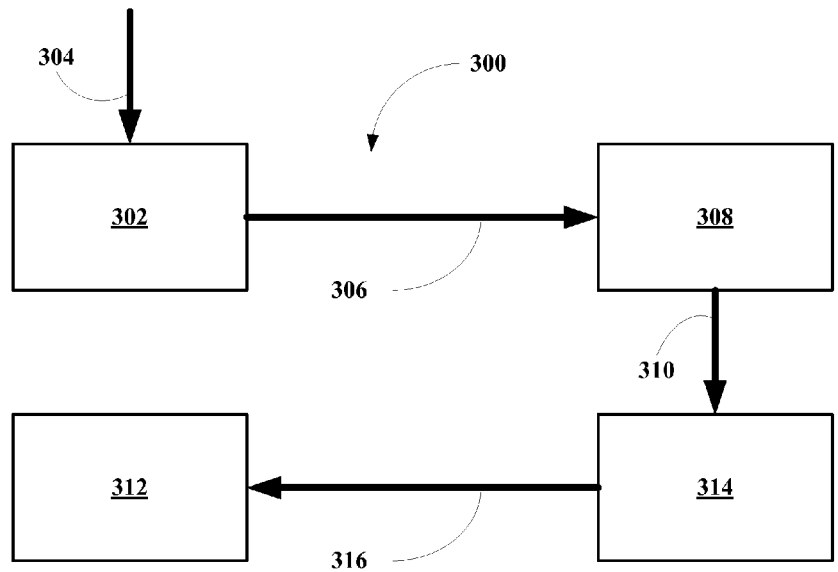

FIG. 3C depicts another embodiment of a burnable fuel supply subsystem including a pre-processing subsystem of this invention.

Figure 3D:
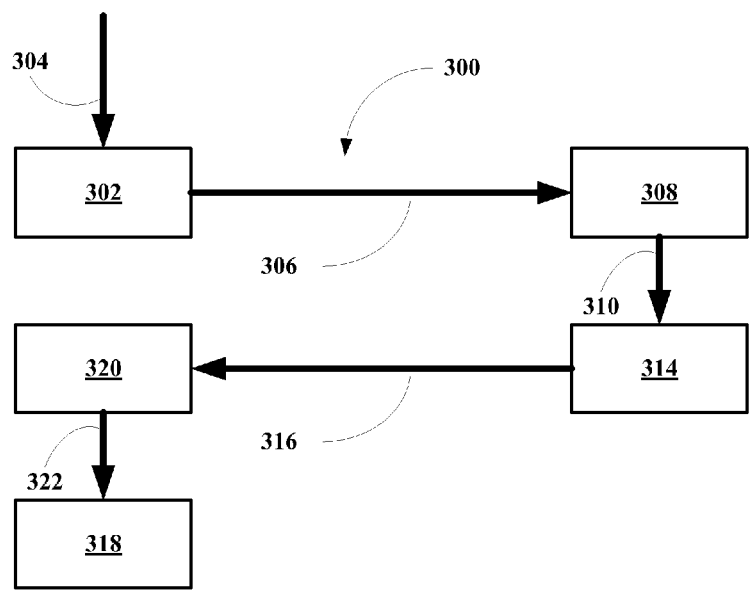

FIG. 3D depicts another embodiment of a burnable fuel supply subsystem including a pre-processing subsystem of this invention.

Figure 3E:
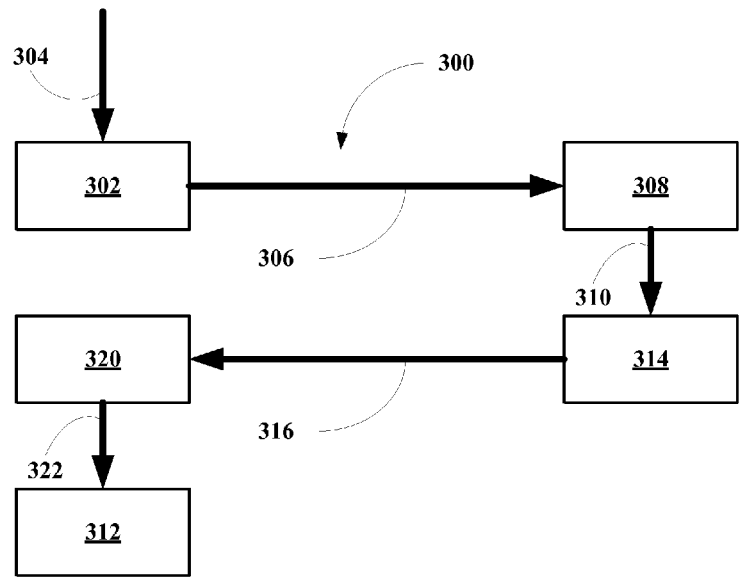

FIG. 3E depicts another embodiment of a burnable fuel supply subsystem including a pre-processing subsystem of this invention.

Figure 3F:
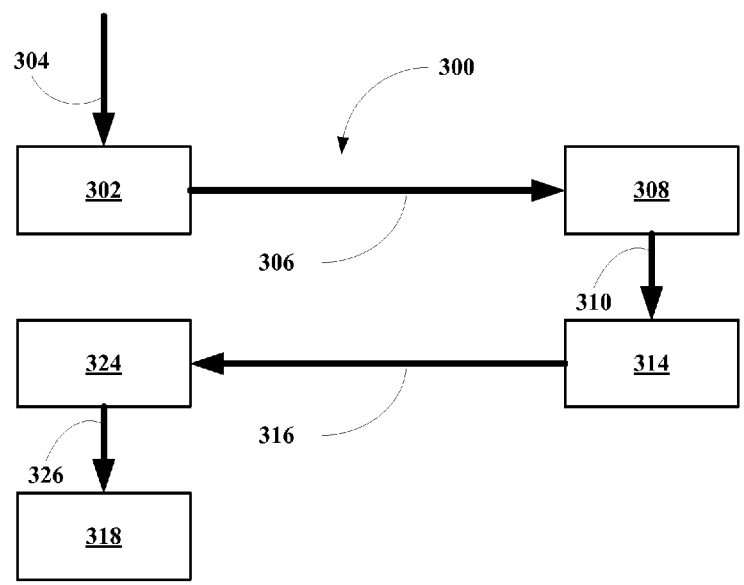

FIG. 3F depicts another embodiment of a burnable fuel supply subsystem including a pre-processing subsystem of this invention.

Figure 3G:
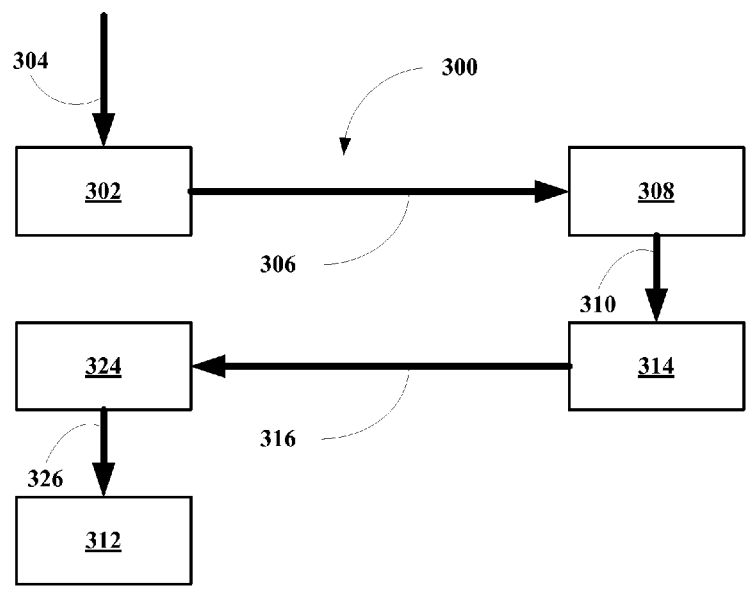

FIG. 3G depicts another embodiment of a burnable fuel supply subsystem including a pre-processing subsystem of this invention.

Figure 3H:
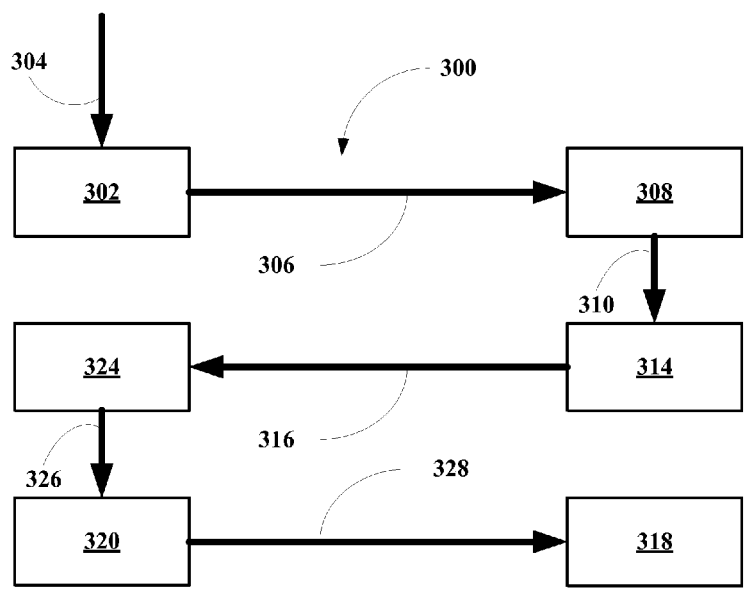

FIG. 3H depicts another embodiment of a burnable fuel supply subsystem including a pre-processing subsystem of this invention.

Figure 3I:
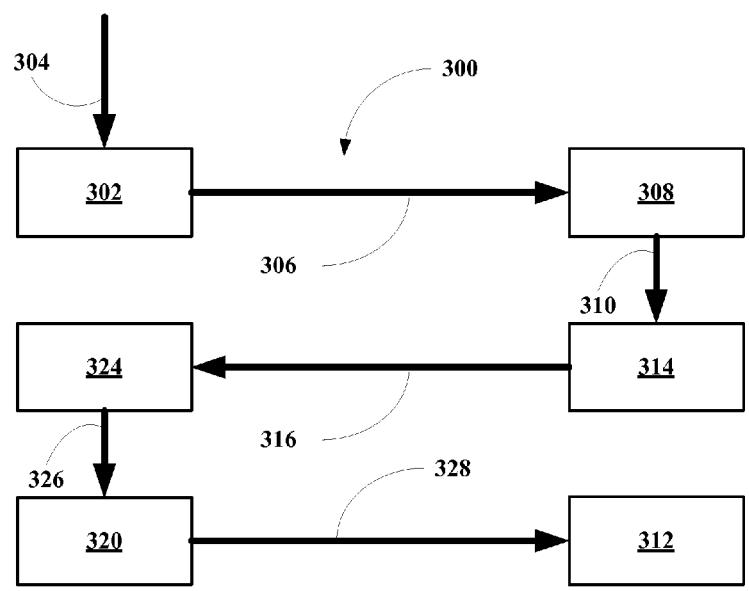

FIG. 3I depicts another embodiment of a burnable fuel supply subsystem including a pre-processing subsystem of this invention.

Burnable Fuel Supply Subsystem Including Two Source Healthcare Materials

Figure 4A:
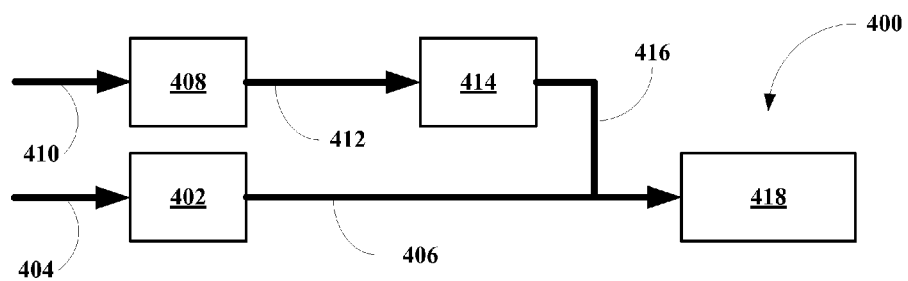

FIG. 4A depicts an embodiment of a burnable fuel supply subsystem including two source healthcare materials of this invention.

Figure 4B:
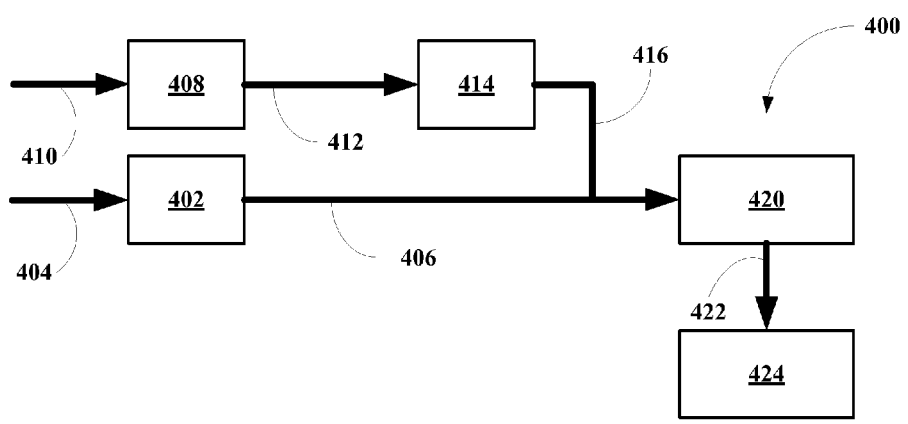

FIG. 4B depicts another embodiment of a burnable fuel supply subsystem including two source healthcare materials of this invention.

Figure 4C:
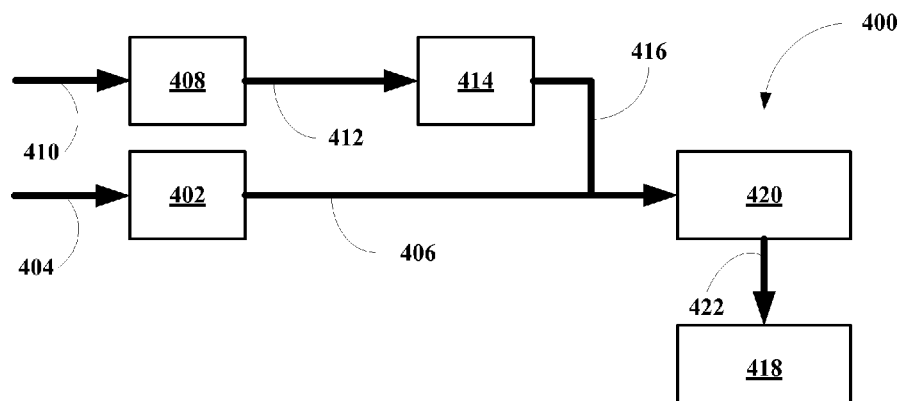

FIG. 4C depicts another embodiment of a burnable fuel supply subsystem including two source healthcare materials of this invention.

Figure 4D:
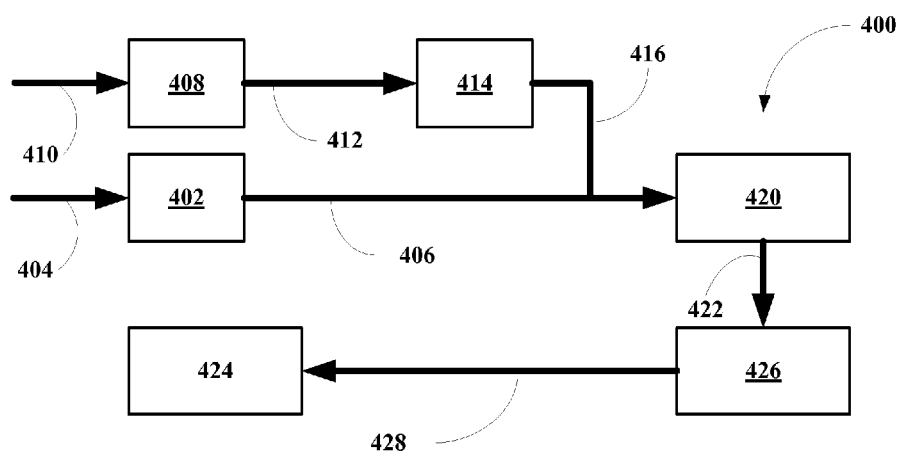

FIG. 4D depicts another embodiment of a burnable fuel supply subsystem including two source healthcare materials of this invention.

Figure 4E:
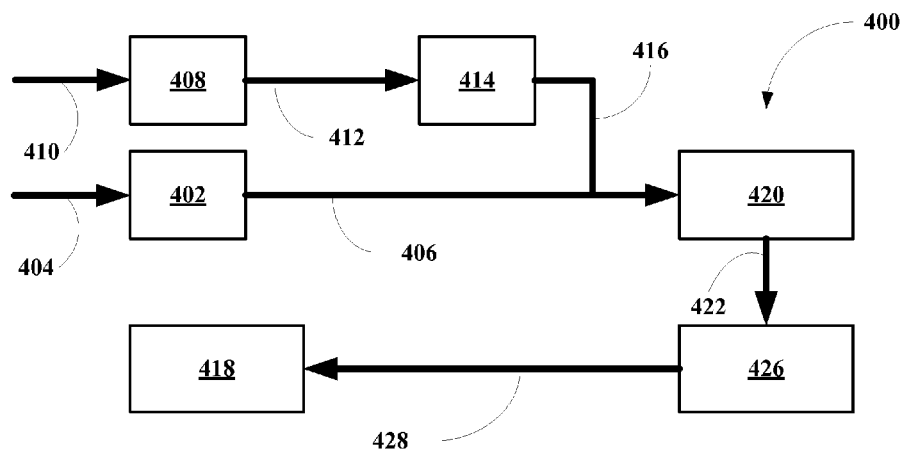

FIG. 4E depicts another embodiment of a burnable fuel supply subsystem including two source healthcare materials of this invention.

Figure 4F:
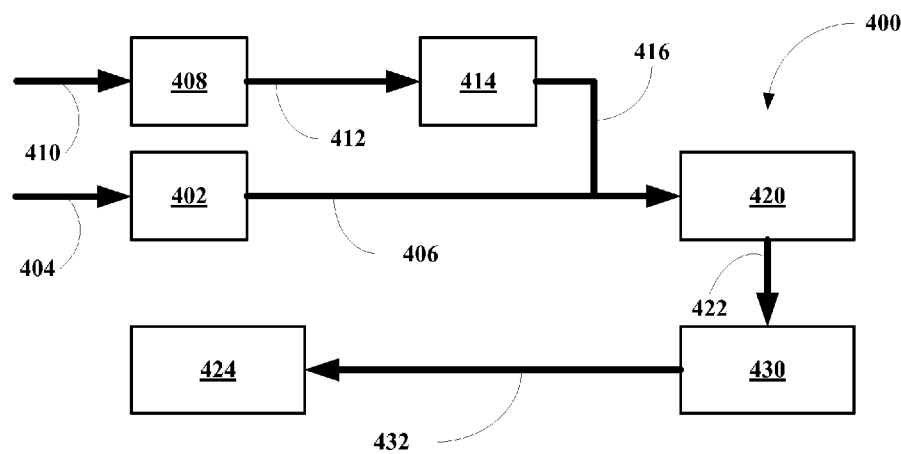

FIG. 4F depicts another embodiment of a burnable fuel supply subsystem including two source healthcare materials of this invention.

Figure 4G:
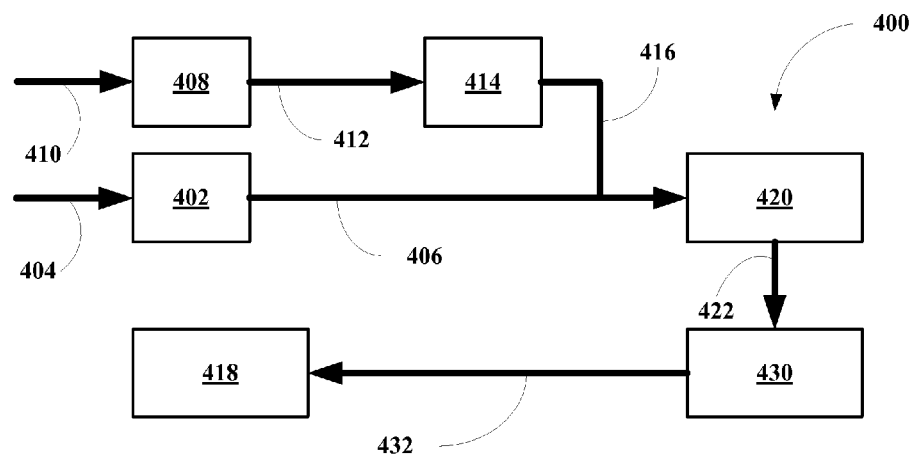

FIG. 4G depicts another embodiment of a burnable fuel supply subsystem including two source healthcare materials of this invention.

Figure 4H:
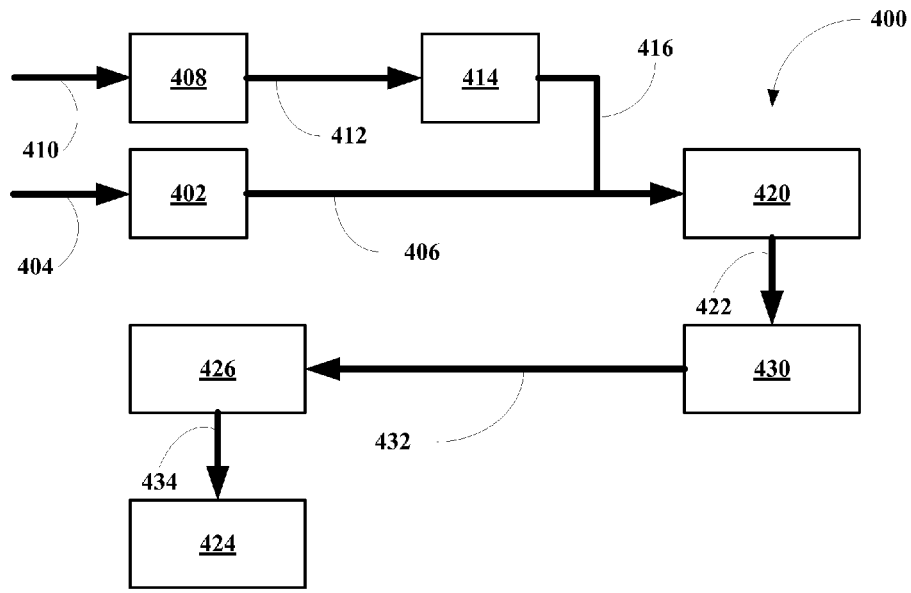

FIG. 4H depicts another embodiment of a burnable fuel supply subsystem including two source healthcare materials of this invention.

Figure 4I:
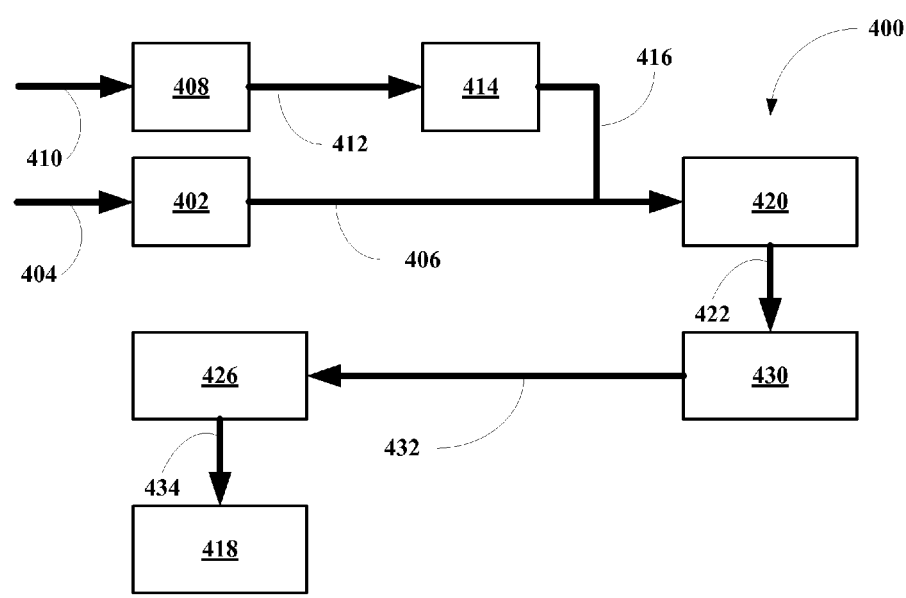

FIG. 4I depicts another embodiment of a burnable fuel supply subsystem including two source healthcare materials of this invention.

Basic Methods

Figure 5A:
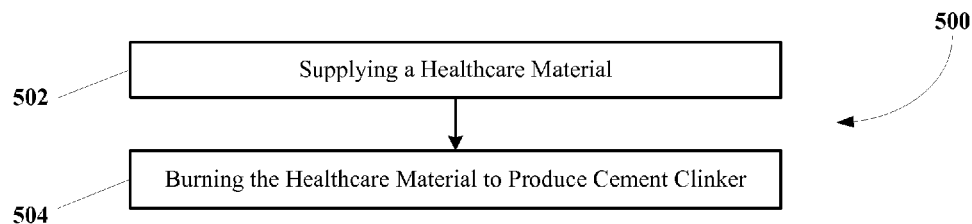

FIG. 5A depicts an embodiment of a basic method of this invention.

Figure 5B:
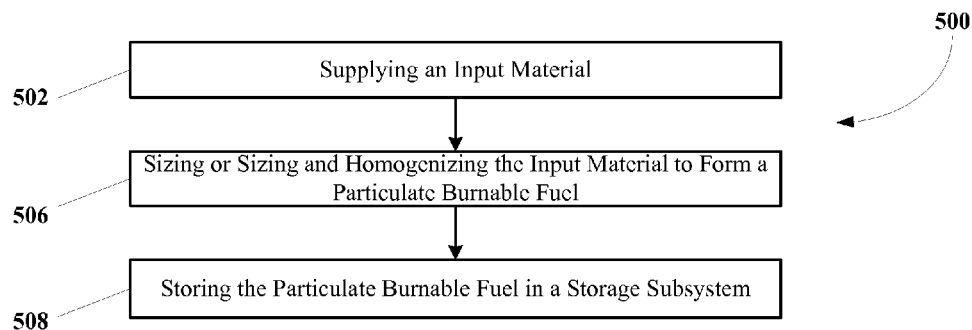

FIG. 5B depicts another embodiment of a basic method of this invention.

Figure 5C:
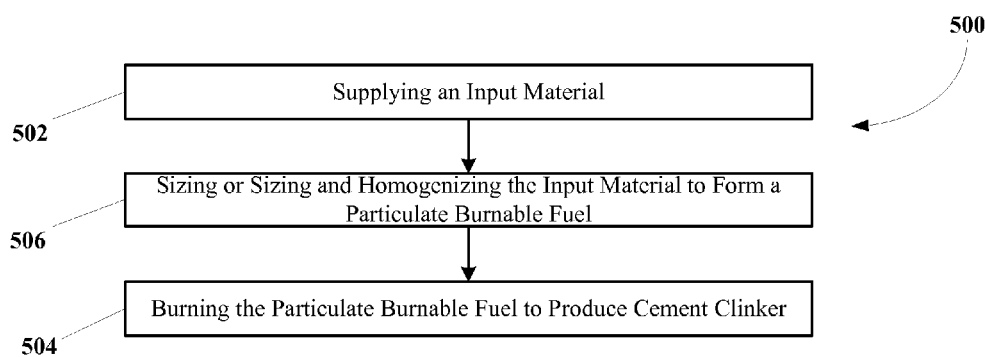

FIG. 5C depicts another embodiment of a basic method of this invention.

Figure 5D:
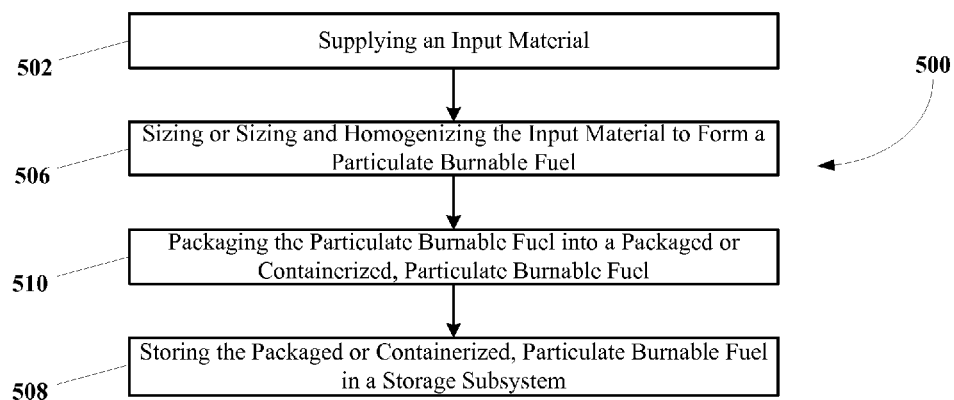

FIG. 5D depicts another embodiment of a basic method of this invention.

Figure 5E:
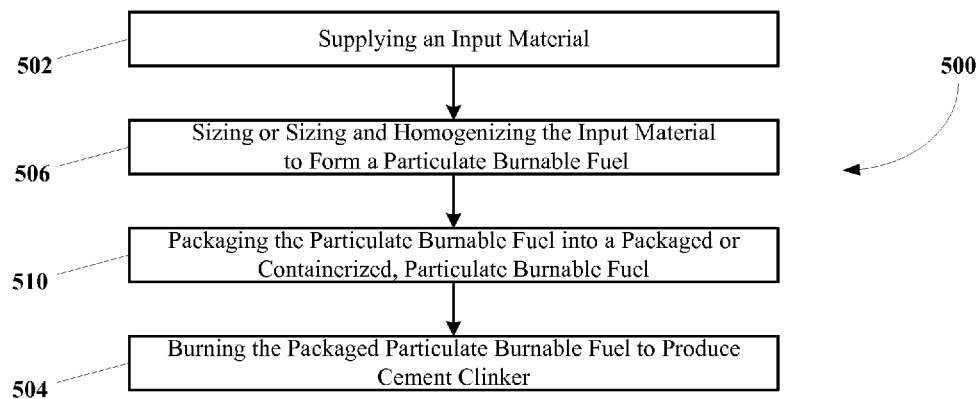

FIG. 5E depicts another embodiment of a basic method of this invention.

Figure 5F:
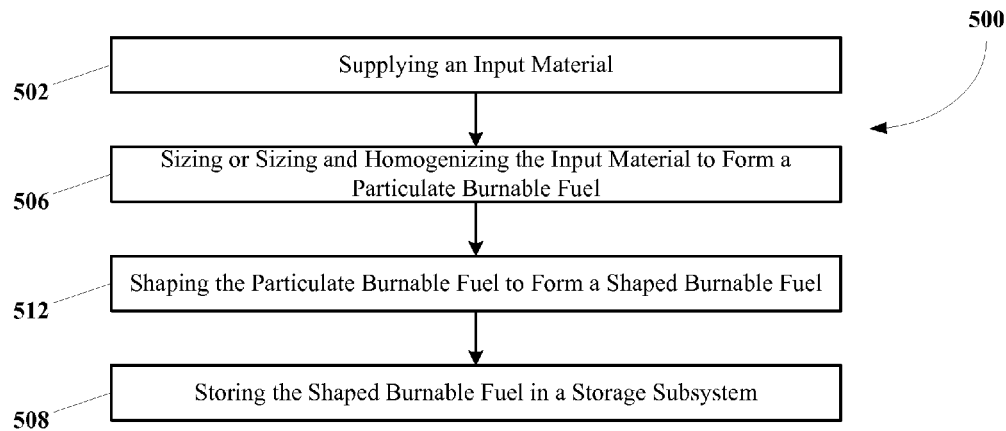

FIG. 5F depicts another embodiment of a basic method of this invention.

Figure 5G:
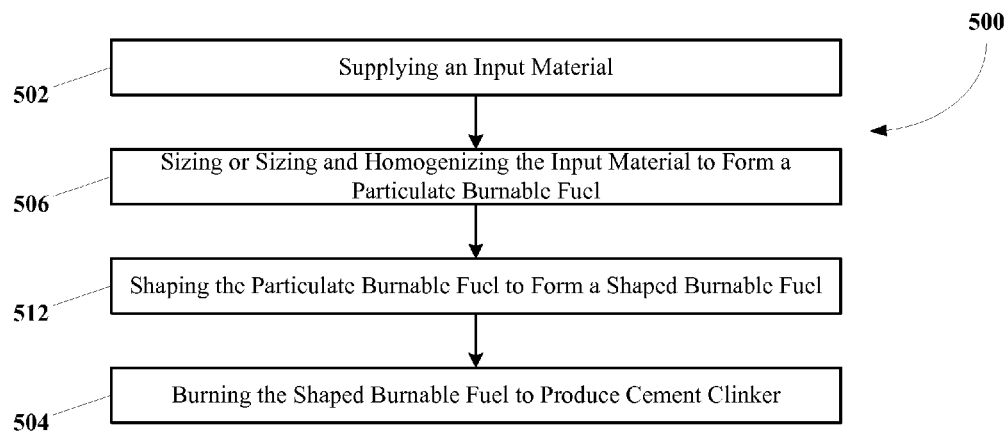

FIG. 5G depicts another embodiment of a basic method of this invention.

Figure 5H:
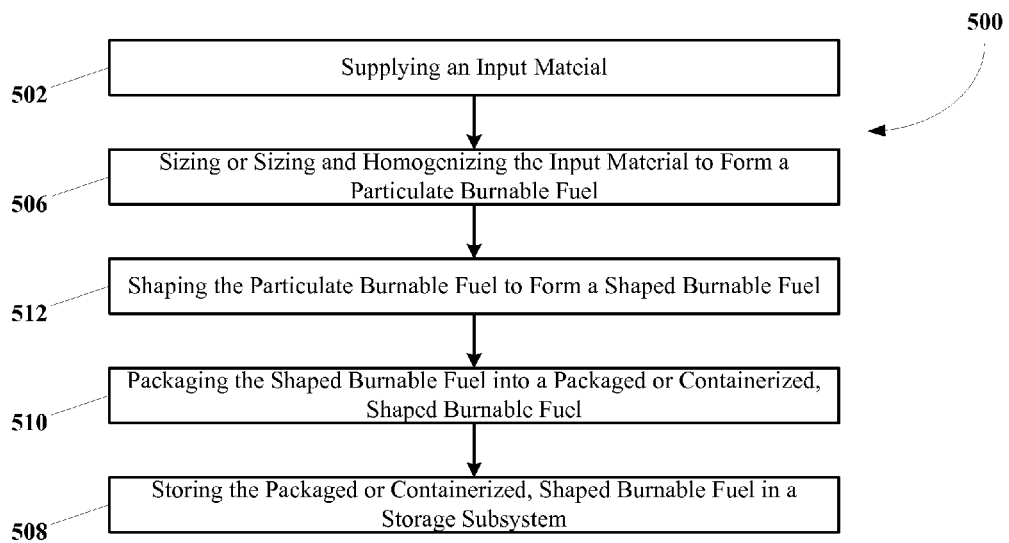

FIG. 5H depicts another embodiment of a basic method of this invention.

Figure 5I:
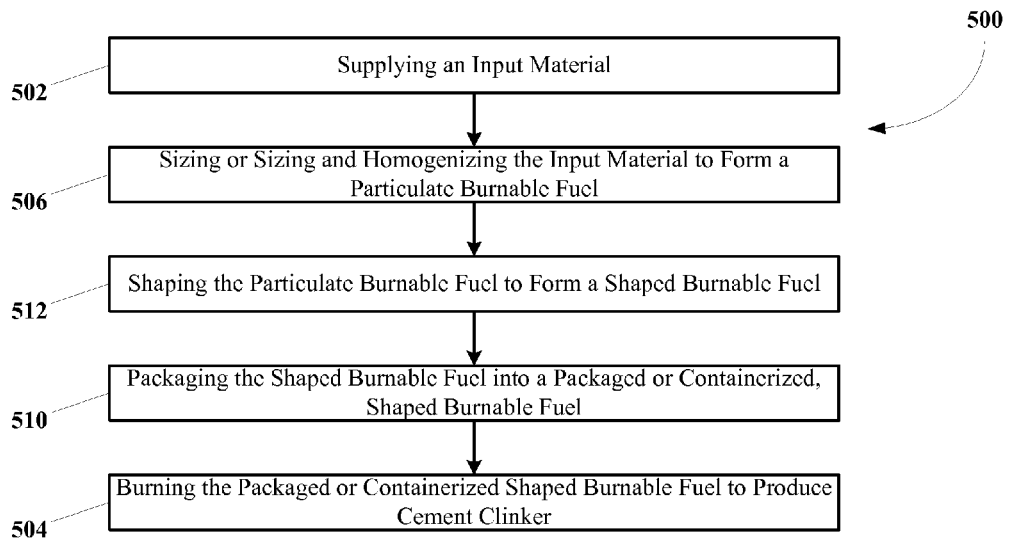

FIG. 5I depicts another embodiment of a basic method of this invention.

Methods Including Pre-Processing

Figure 6A:
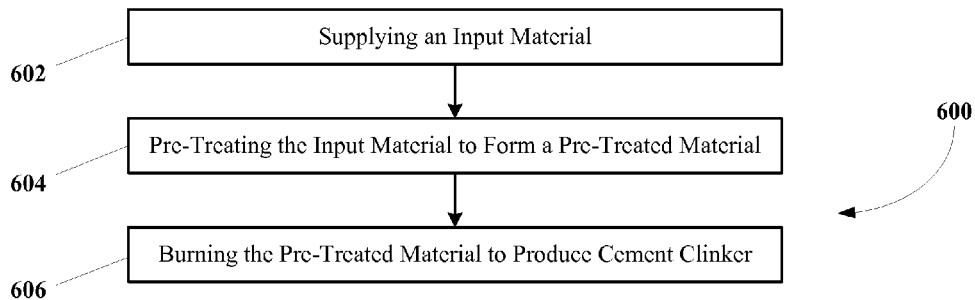

FIG. 6A depicts an embodiment of a method including pre-processing of this invention.

Figure 6B:
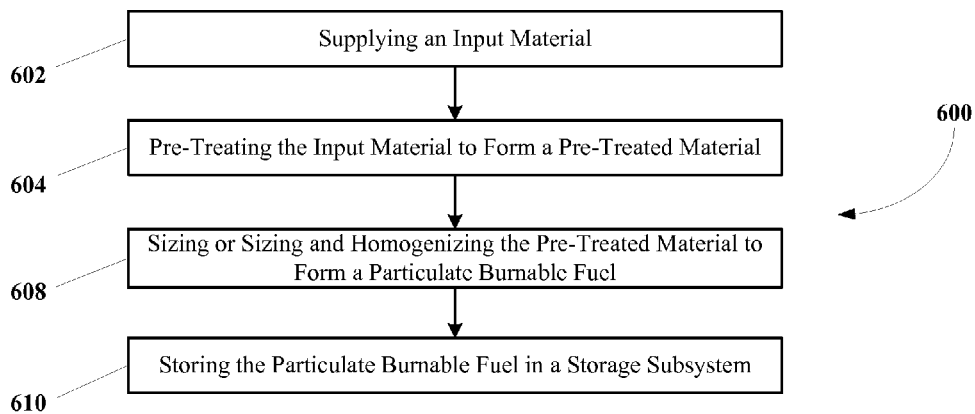

FIG. 6B depicts another embodiment of a method including pre-processing of this invention.

Figure 6C:
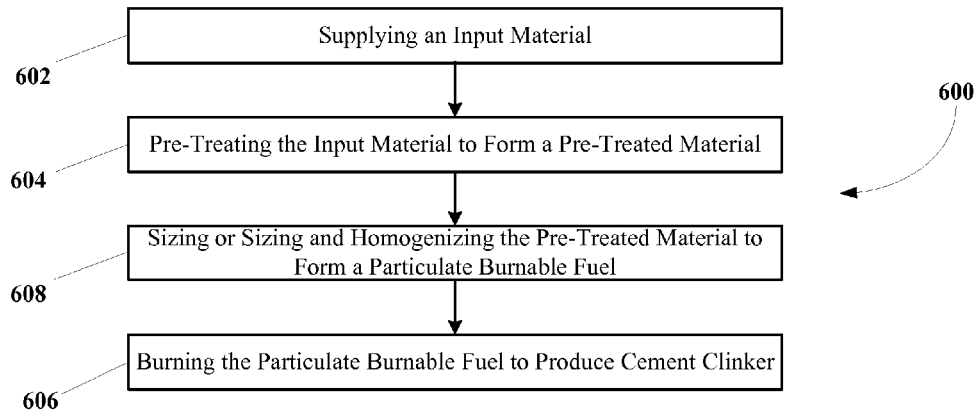

FIG. 6C depicts another embodiment of a method including pre-processing of this invention.

Figure 6D:
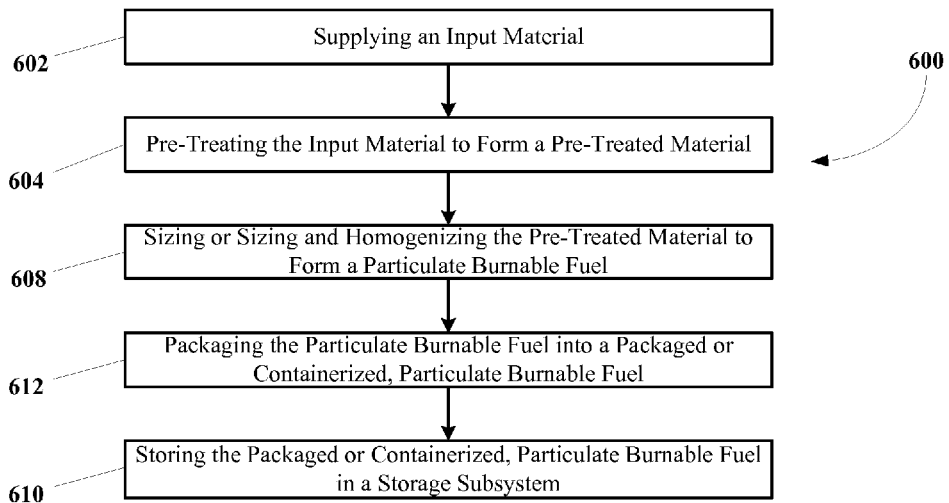

FIG. 6D depicts another embodiment of a method including pre-processing of this invention.

Figure 6E:
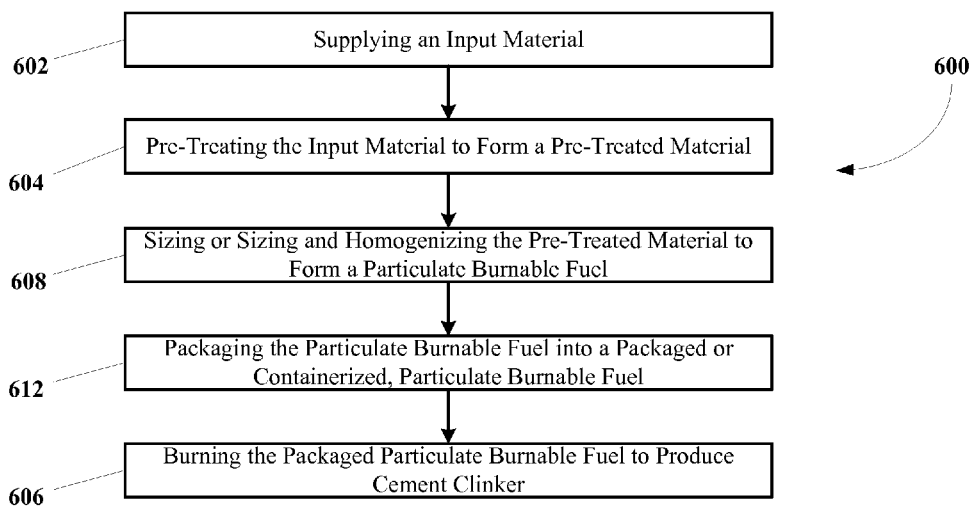

FIG. 6E depicts another embodiment of a method including pre-processing of this invention.

Figure 6F:
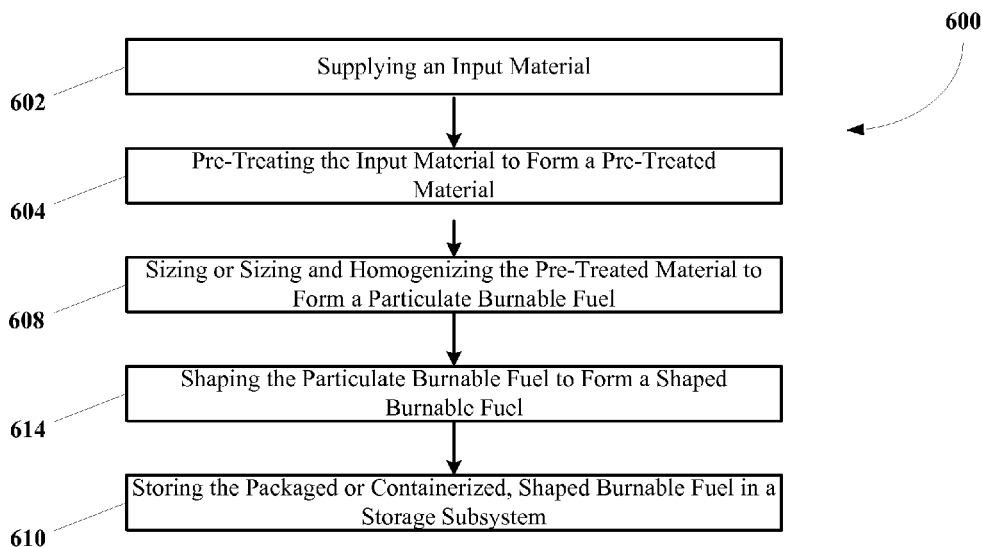

FIG. 6F depicts another embodiment of a method including pre-processing of this invention.

Figure 6G:
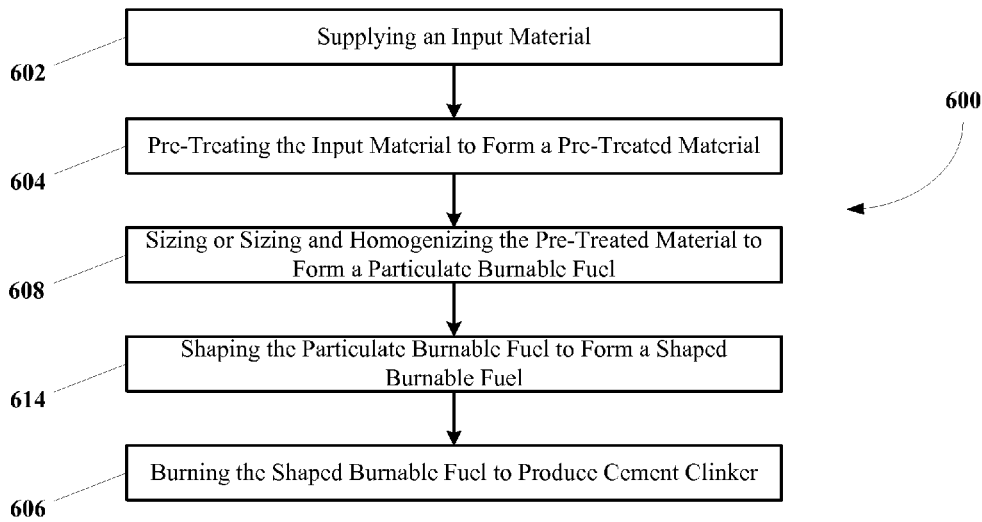

FIG. 6G depicts another embodiment of a method including pre-processing of this invention.

Figure 6H:
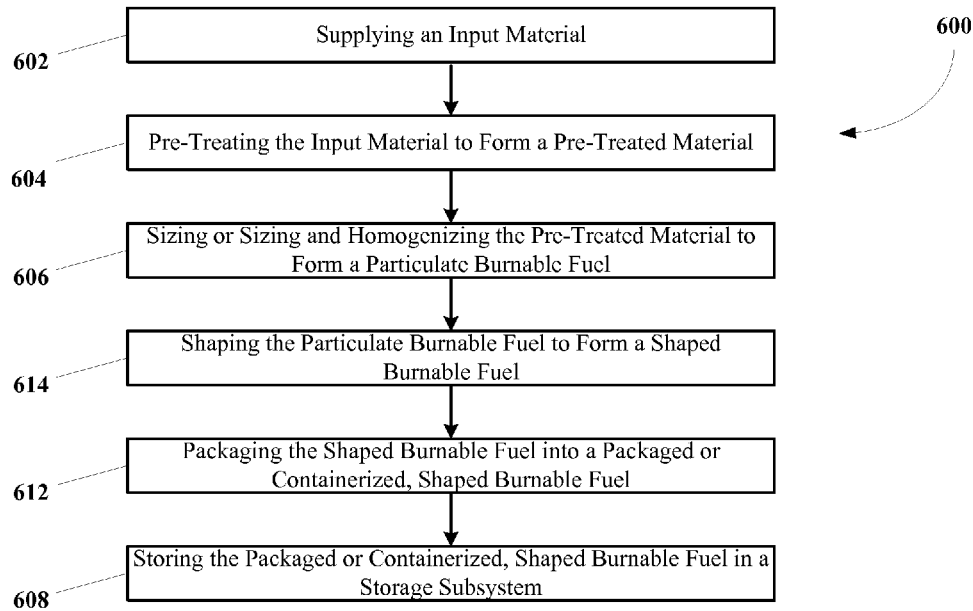

FIG. 6H depicts another embodiment of a method including pre-processing of this invention.

Figure 6I:
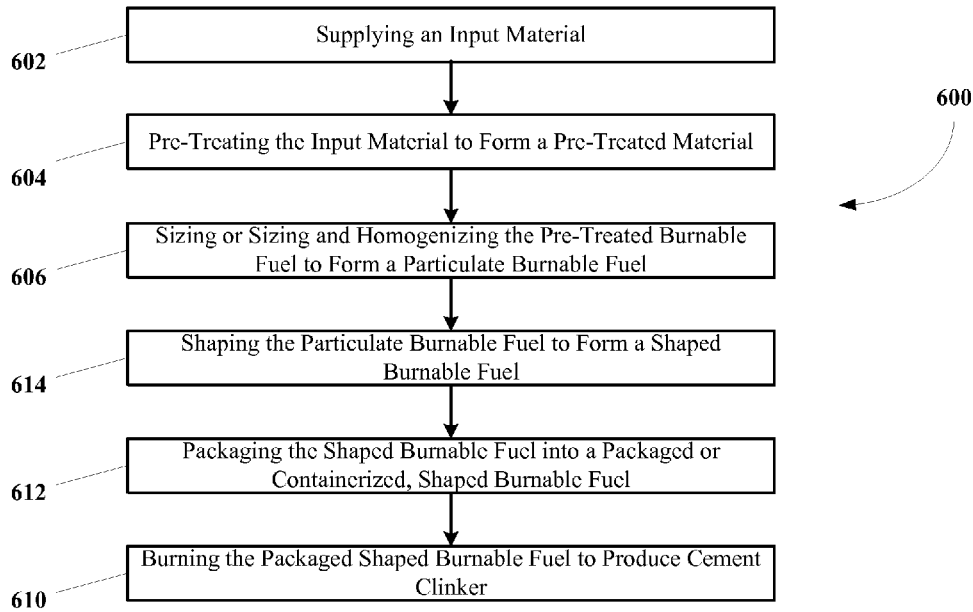

FIG. 6I depicts another embodiment of a method including pre-processing of this invention.

Methods Including Two Source Healthcare Materials

Figure 7A:
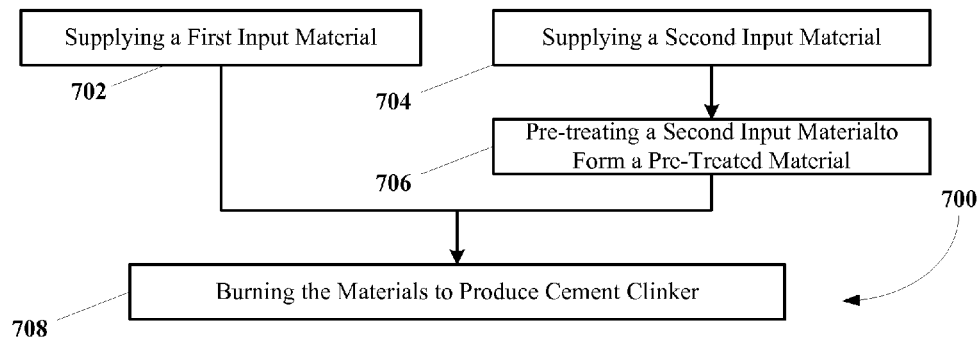

FIG. 7A depicts an embodiment of a method including two source healthcare materials of this invention.

Figure 7B:
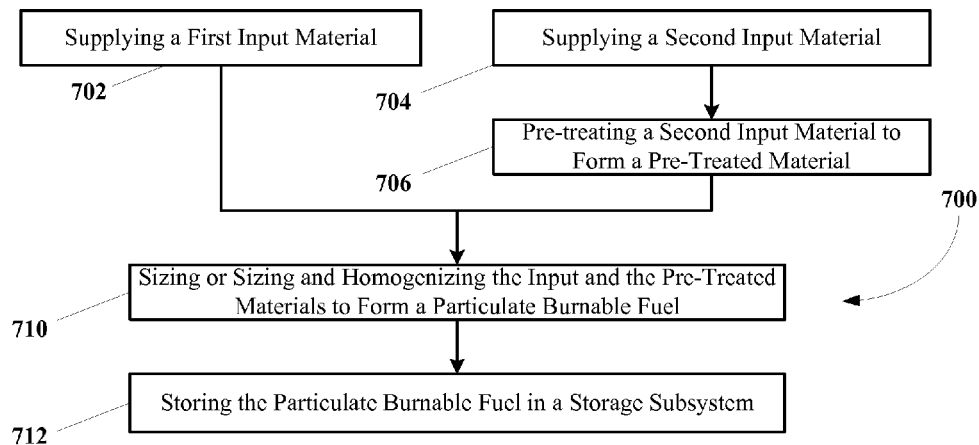

FIG. 7B depicts another embodiment of a method including two source healthcare materials of this invention.

Figure 7C:
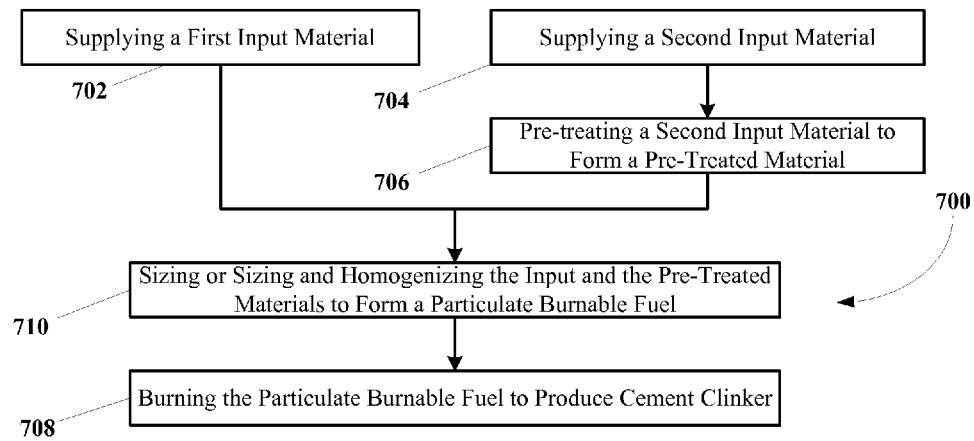

FIG. 7C depicts another embodiment of a method including two source healthcare materials of this invention.

Figure 7D:
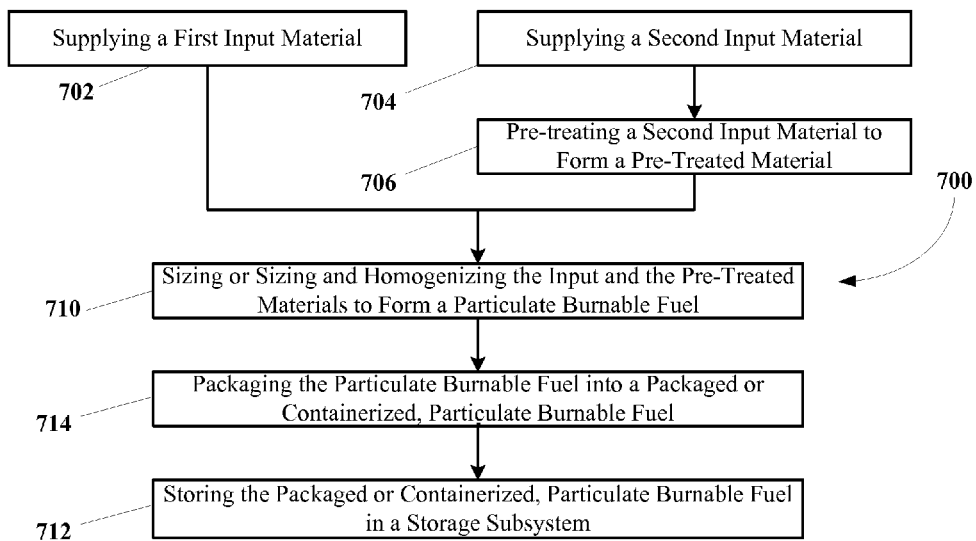

FIG. 7D depicts another embodiment of a method including two source healthcare materials of this invention.

Figure 7E:
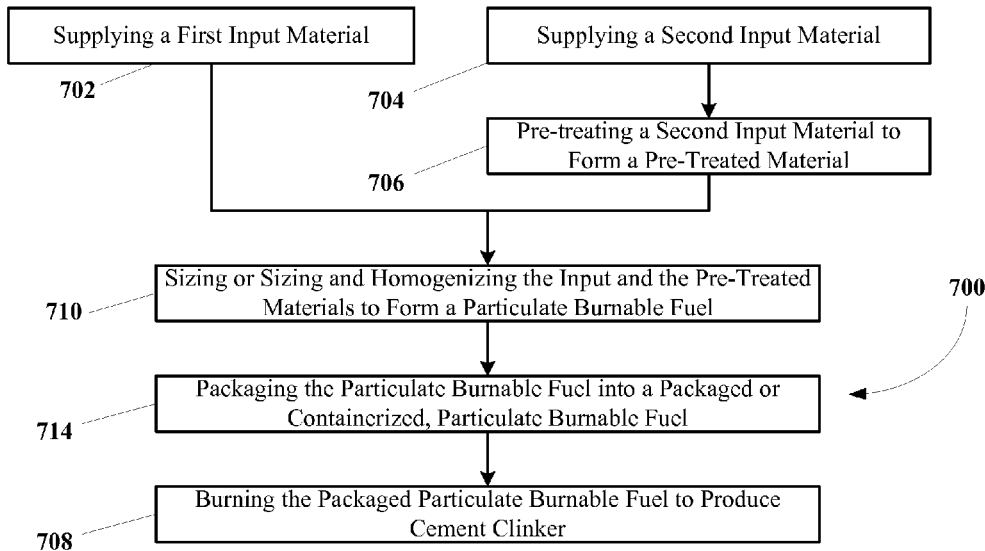

FIG. 7E depicts another embodiment of a method including two source healthcare materials of this invention.

Figure 7F:
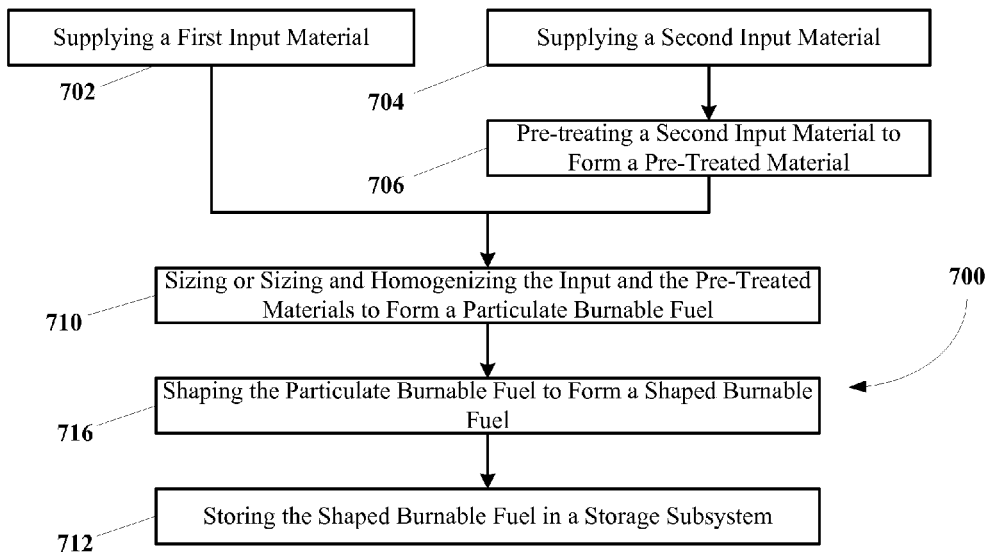

FIG. 7F depicts another embodiment of a method including two source healthcare materials of this invention.

Figure 7G:
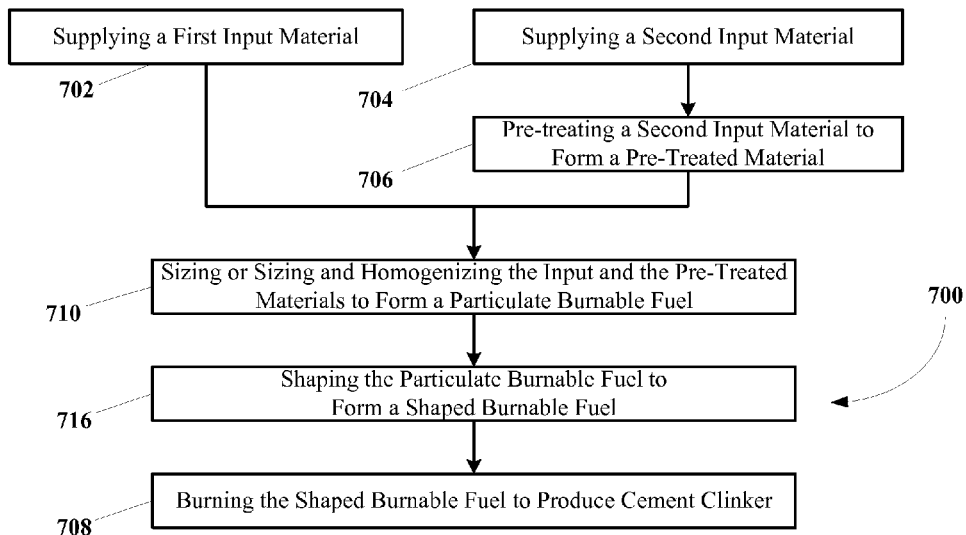

FIG. 7G depicts another embodiment of a method including two source healthcare materials of this invention.

Figure 7H:
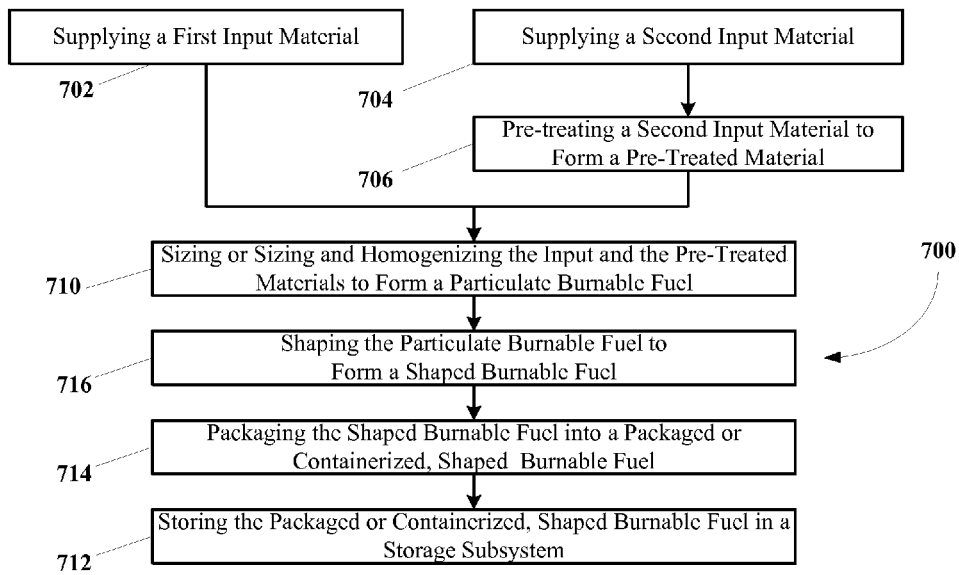

FIG. 7H depicts another embodiment of a method including two source healthcare materials of this invention.

Figure 7I:
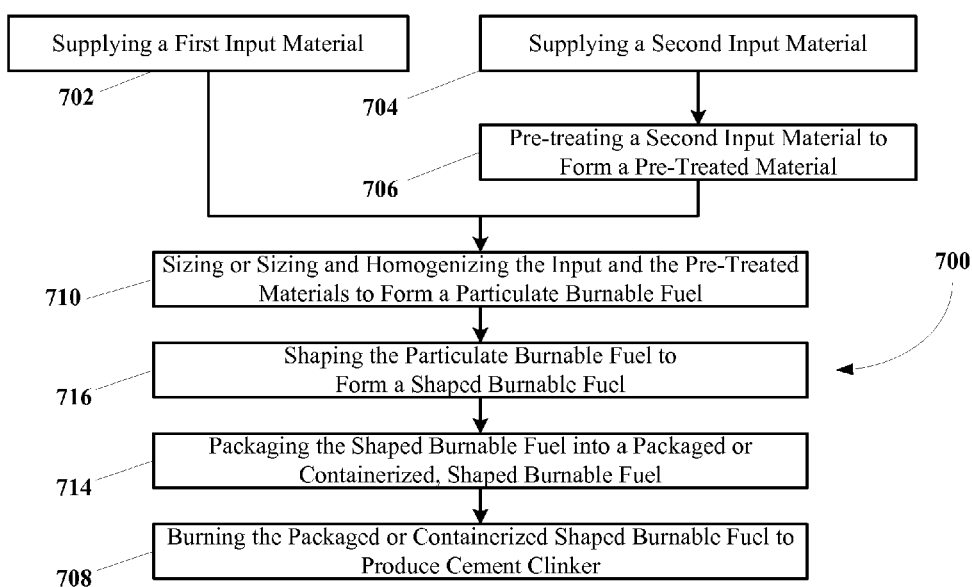

FIG. 7I depicts another embodiment of a method including two source healthcare materials of this invention.

Burnable Fuels

Figure 8:

FIG. 8 depicts an image of a particulate burnable fuel of this invention.

Figure 9:
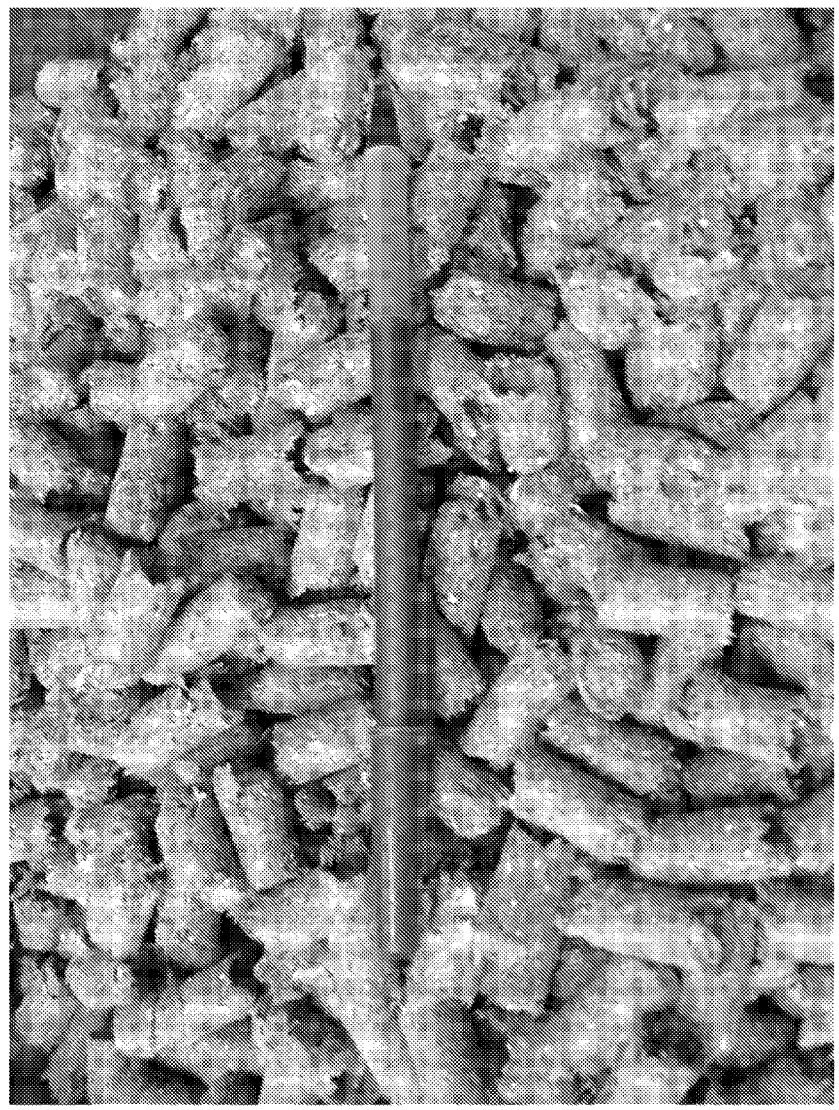

FIG. 9 depicts an image of a shaped burnable fuel of this invention.

Figure 10:
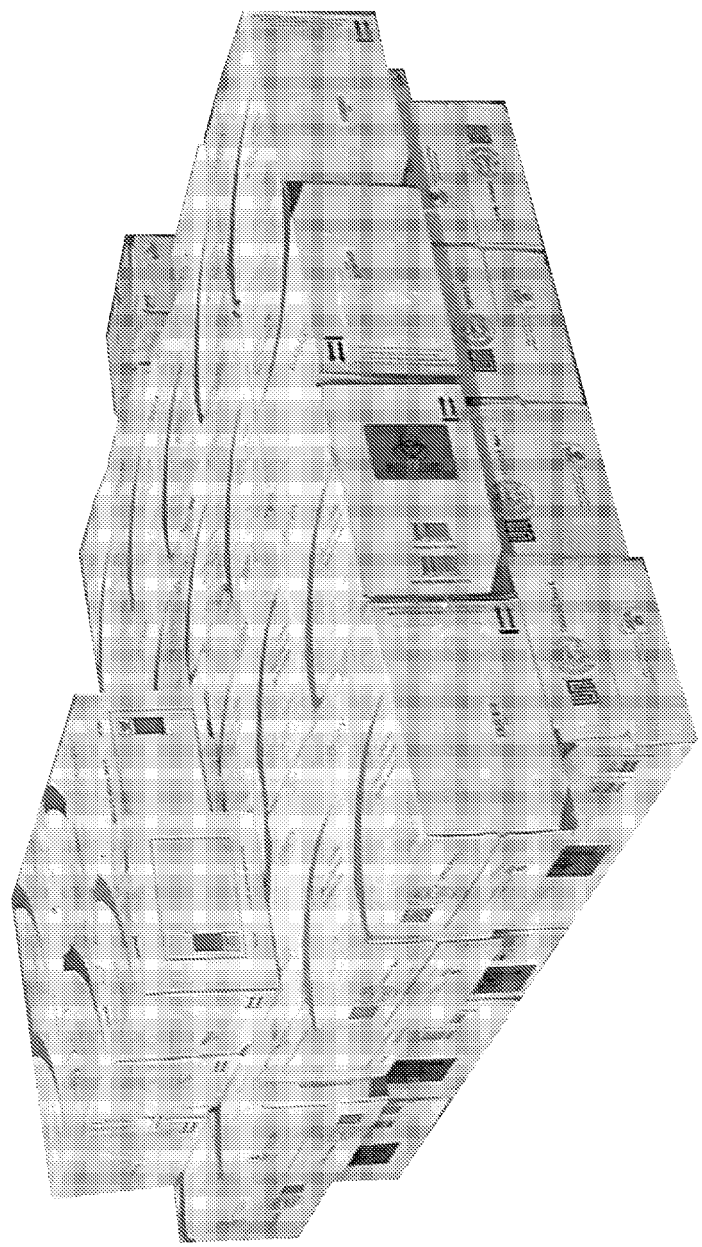

FIG. 10 depicts an image of a source of used healthcare material comprising boxes delivered to the burnable fuel supply subsystem by the United States Postal Service.

Figure 11:
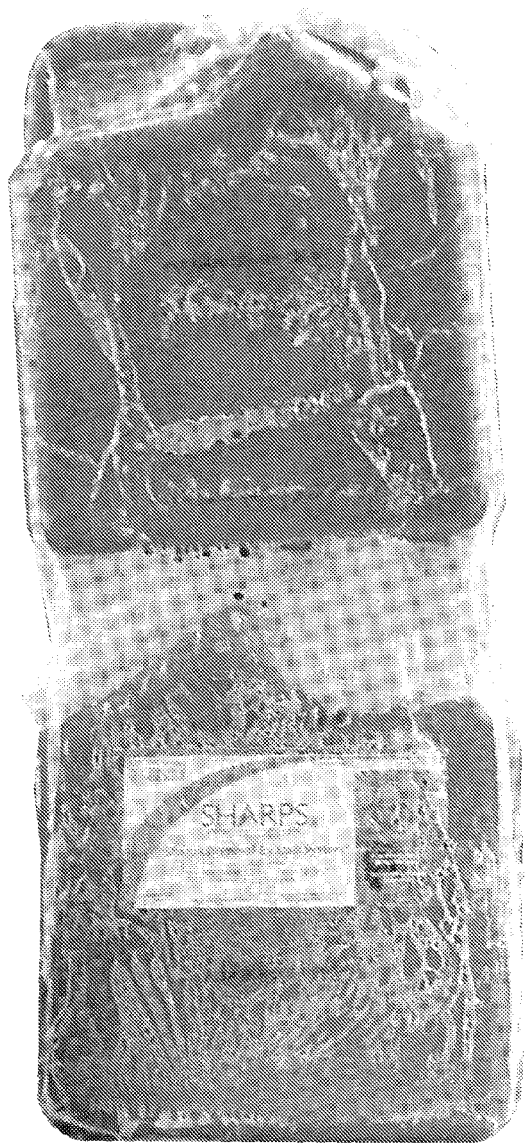

FIG. 11 depicts an image of a pre-treated (disinfected) source of used healthcare material, which can be burned directly or subsequently processed as set forth herein.

DETAILED DESCRIPTION OF THE INVENTION

The inventors have found that an integrated cement plant can be implemented, where some or all of the fuel needs are meant through a burnable fuel derived from one or a plurality of healthcare materials (used and/or unused) formed into an input burnable fuel having a desired compositions of material components. Embodiments of the invention include a cement plant including an integrated burnable fuel supply subsystem that receives one or a plurality of healthcare materials (used and/or unused), optionally one or more virgin materials, optionally one or more other materials and produces a burnable fuel tailored to meet the fuel needs of the cement plant from a fuel value and compositional perspective. The burnable fuel supply subsystem can supply: (i) an input burnable fuel and/or a containerized input burnable fuel, (ii) a pre-processed material and/or a containerized pre-processed material, (iii) a particulate burnable fuel and/or a containerized particulate burnable fuel, (iv) a shaped burnable fuel and/or a containerized shaped burnable fuel, (v) one or more traditional fuels, or (vi) a mixture or combination of any of the above, provided that the mixture or combination include one of the fuels derived from the healthcare materials. For particulate burnable fuel embodiments, the burnable fuel supply subsystem may include a feeder assembly for feeding the particulate burnable fuel directly into the kiln subsystem. Many of the particulate burnable fuels of this invention are fluffy and as such may require specialized feeder assemblies to feed the fuel into the kiln subsystem. For mixed fuel embodiments, the burnable fuel supply subsystem may include a feeder assembly for feeding the particulate burnable fuel, a separate feeding assembly for feeding the shaped burnable fuel, a separate feeding assembly for feeding an input burnable fuel and/or a pre-processed burnable fuel directly into a kiln subsystem and a separate feeding assembly for feeding the one or more traditional fuels into the kiln subsystem. In other mixed fuel embodiments, the burnable fuel supply subsystem may include a single feeding assembly for feeding a fuel including one or more input burnable fuels, one or more pre-processed burnable fuels, one or more particulate burnable fuels, and/or one or more shaped burnable fuels and optionally one or more traditional fuels.

Suitable Reagents and Equipment of the Invention

Suitable healthcare materials (used and/or unused) include, without limitation, any healthcare material, which can include medical waste generated by people, doctors, doctor offices, clinics, emergency clinics, hospitals, dentists, dentistry clinics and hospitals, veterinarians, veterinary clinics and hospitals, farms, farmer, ranches, ranchers, or producers of used healthcare material and/or other facilities that produce used healthcare material or unused healthcare materials, or mixtures or combinations. The healthcare material (used and/or unused) is generally a complex mixture of components. The complex mixtures include, without limitation, metal materials or metallic materials, pulp materials, polymer materials and/or other materials.

Pulp materials suitable for use herein include, without limitation, wood, wood chips, sawdust, paper, cardboard, and/or mixtures or combinations thereof.

Fiber materials suitable for use herein include, without limitation, natural fibers, synthetic fibers, or the like and mixtures or combinations thereof. Exemplary fibers include, without limitation, inorganic fibers, carbon fibers, organic fibers, ceramic fibers, any other fibrous material and mixtures or combinations thereof.

Fabric materials suitable for use herein include, without limitation, any natural or synthetic fabric and mixtures or combinations thereof. Exemplary examples include, without limitation, cotton, wool and other fabrics made from animals or plants, RAYON, DACRON, fabric made of polyamides, or any other fabric or mixtures or combinations thereof.

The metal or metallic materials include, without limitation, any metal or metal alloy including a metal from the periodic table of elements. Exemplary examples include, alkali metals (Group 1 metals), alkaline earth metals (Group 2 metals), transition metals (Group 3-12 metals), Lanthanide metals, Actinide metals, post-transition metals, metalloids, or mixtures or combinations thereof. Certain metals and metalloids may be removed prior to use depending on the use to which the burnable fuels is put. The metals can be in any form such as fibers, pieces, devices including metals, etc. and mixtures or combinations thereof.

Ceramic materials suitable for use herein include, without limitation, any ceramic material or ceramic containing material or mixtures or combinations thereof. Exemplary examples include, without limitation, glass, dishes, clay pots, any other object that contains a ceramic material, and mixtures or combinations thereof.

The polymer materials suitable for use herein include, without limitation, plastics, thermoplastics, elastomers, thermoplastic elastomers, resins, and other polymer or polymeric materials and/or mixtures or combinations thereof.

Other materials can include, without limitation, chemicals, ash, pharmaceuticals, ceramics, binding agents, any other materials and/or mixtures or combinations thereof. The inventors have also found that ash derived from incinerating certain used or waste materials, where the ash still has components or fuel value can be added to the material to change or augment a compositional makeup of the fuel.

In all of the mixtures, polymer materials from other sources of waste or virgin polymer materials can be added as binding agents to the material before burning or before forming the material into a desired compact shape followed by combustion of the fuel. The inventors believe that certain materials in the fuels of this invention, such as polymeric materials or other binding agents, act as binders in the shaping process, e.g., pelletizing, and help to increase the combustible nature of the resulting fuel.

Suitable virgin materials can be any material that has not been used and is added to the input burnable fuel to change a property of the resulting fuel including altering a fuel value of the material, altering an ash composition of the material, altering a fluidity of the material, altering a bulk density of the material, altering the cohesiveness of the material, altering the wettability of the material, or altering other properties or two or more properties of the material.

Suitable pre-treating or pre-processing equipment includes, without limitation, heating units, vaporizing units, pyrolyzing units, washing units (water or solvent), cracking units, cooling units, magnetic separation units, electrolysis units, air floatation units, screening units, segregating units, sedimentation units, fracturing units, shredding units, ultrasonic units, disinfecting units, sterilizing units, chemical treating units, neutralizing units, quality control units, cryogenic units, condensing units, polymerizing units, and mixtures or combinations.

Suitable disinfecting and/or partially or completely sterilizing equipment include, without limitation, any equipment that can disinfect, and/or partially or completely sterilize used or waste material such as autoclaves including those manufactured by OnSite Sterilization, LLC of Pottstown, Pa., chemical treatments, thermal treatments, radiant treatments, radiological treatments, or any combination thereof. It should be recognized that this equipment is commonly referred to as treatment equipment in used healthcare material processing.

Suitable sizing and homogenizing equipment includes, without limitation, shredders, grinders, choppers, hammer mills, ball mills, or any other equipment used to reduce the physical size of a complex material or any combination of these equipment in series, parallel or a combination thereof. Shedders including those manufactured by SSI Shredding Systems, Inc. of Wilsonville, Oreg.

Suitable shaping equipment includes, without limitation, pelletizes such as those manufactured by Roskamp Champion of Waterloo, La. or California Pellet Mill Co. of Crawfordsville, Ind., extruders, other compressing forming equipment or any combination thereof.

Suitable incinerator equipment include, without limitation, any incinerator equipment, pyrolysis treatments, plasma treatments, or other treatments that can burn or combust a used or waste material to an ash, having a given un-used fuel value from 0 to some finite value. Exemplary examples include CONSUMAT® Incinerators manufactured by Consutech Systems, LLC (CONSUMAT is a registered trademark of Consutech Systems, LLC).

Suitable traditional or conventional fuels for use in this invention include, without limitation, coal, coke, natural gas, propane, diesel, gasoline, jet fuel, other liquid hydrocarbon fuel, and mixtures or combinations thereof.

For embodiments of the fuels derived from the present invention that are designed to be formed or shaped into a consolidated structure such as a pellet, the used or waste material compositions include an effective amount of binding agents, sufficient to permit the shaping to maintain its final shape. The binding agents are selected from the group consisting of polymer materials that have a melting or softening temperature between about 40° C. and about 150° C. In certain embodiments, the binding agents are polymer components in used or waste material having a melting or softening temperature between about 40° C. and about 150° C. Exemplary examples of such polymeric materials include, without limitation, modified cellulose, fabrics, plastics, thermoplastics, thermoplastic elastomers, elastomers, fiber enforced resins, metalized or metal coated plastics or polymers, or other polymeric materials and mixtures or combinations thereof. Exemplary plastics and thermoplastics include, without limitation, polyolefins, fluorinated polyolefins, chlorinated polyolefins, polyurethanes, polyalkyleneoxides, polyethers, polyesters, polyamides, polyimides, polycarbonates, epoxy resins, phenolic resins, alkylide resins, polyacrylates, polylactic acid, polyglycolic acid, other biocompatible polymers, and mixtures or combinations thereof. In other embodiments, binding agents can be added to the material to enhance or improve consolidation, to change or alter final ash composition, to reduce or increase metal content, to change or alter consolidated particle properties, to modify or change final particle appearance, or to enhance, improve, alter or change any other final property of the consolidated products of this invention. In specific embodiments, materials can be added to the burnable fuel as is, before or after shaping to adjust a heat content of the burnable fuel regardless of its nature or shape.

Healthcare Material Compositions Useful in the Invention

Embodiments of this invention can be practiced using a broad distributions of one or a plurality of used and/or unused healthcare materials including a complex, but definable, mixture of combustible components and non-combustible components. Exemplary examples of both combustible and non-combustible components include, without limitation, pulp materials, fiber materials, fabric materials, polymer materials, metal materials, ceramic materials, ash materials, and/or other materials. Depending on their use, the compositions of this invention can be tailored to meet any desired need. By controlling the relative amount of combustible materials and non-combustible materials in the input burnable fuel, properties of the fuel can be adjusted to produce a desired fuel composition and a desired ash composition. Such input burnable fuel properties include, without, limitation, a fuel value, a burn rate, a flow rate, an ash composition, an ash weight, by-product compositions and types or any mixture or combination of properties. Other materials can be included to tailor or control fuel properties or to control the ash formed upon burning of the fuel. The fuel value can be adjusted up or down by changing the mix of combustible present and non-combustible materials. The fuel can be further augmented by adding conventional fuels to the input burnable fuel or treated material before or simultaneous with burning of the burnable fuels of this invention.

Embodiments of this invention include broad class distributions including polymer materials such as plastics, thermoplastics, etc., pulp materials such as paper materials, cardboard materials, natural fibrous material, fabrics, etc., and metal materials such as aluminum, aluminum alloys, iron, iron alloys, nickel, nickel alloys, tin, tin alloys, copper, copper alloys, etc. and/or mixtures of combinations thereof. As to these broad classes, the present invention relates to compositions including from about 20 wt. % to about 100 wt. % polymer materials, from about 0 wt. % to about 100 wt. % of pulp materials, and from about 0 wt. % to about 10 wt. % metal materials. In other embodiments, the compositions include from about 60 wt. % to about 100 wt. % polymer materials, from about 20 wt. % to about 100 wt. % of pulp materials, and from about 1 wt. % to about 10 wt. % metal materials. In other embodiments, the compositions include from about 70 wt. % to about 100 wt. % polymer materials, from about 15 wt. % to about 70 wt. % of pulp materials, and from about 0 wt. % to about 5 wt. % metal materials. In other embodiments, the compositions include from about 50 wt. % to about 70 wt. % polymer materials, from about 15 wt. % to about 70 wt. % of pulp materials, and from about 0 wt. % to about 5 wt. % metal materials. In these formulations, the weight percentages are not confined to add up to 100%, but are relative amounts on a weight basis of the final composition. To determine the actual percentage in final composition, all of the weight percentages would be added up to give the overall formulation weight, then simple percentages can be determined.

Embodiments of the present invention relate to compositions including from about 20 wt. % to about 100 wt. % polymer materials, from about 0 wt. % to about 100 wt. % of pulp materials, from about 0 wt. % to about 10 wt. % metal materials, and from about 0 wt. % to about 50 wt. % other materials. In other embodiments, the compositions include from about 60 wt. % to about 100 wt. % polymer materials, from about 20 wt. % to about 100 wt. % of pulp materials, from about 1 wt. % to about 10 wt. % metal materials, and from about 0 wt. % to about 50 wt. % other materials. In other embodiments, the compositions include from about 70 wt. % to about 100 wt. % polymer materials, from about 15 wt. % to about 70 wt. % of pulp materials, from about 0 wt. % to about 5 wt. % metal materials, and from about 0 wt. % to about 50 wt. % other materials. In other embodiments, the compositions include from about 50 wt. % to about 70 wt. % polymer materials, from about 15 wt. % to about 70 wt. % of pulp materials, from about 0 wt. % to about 5 wt. % metal materials, and from about 0 wt. % to about 50 wt. % other materials. In these formulations, the weight percentages are not confined to add up to 100%, but are relative amounts on a weight basis of the final composition. To determine the actual percentage in final composition, all of the weight percentages would be added up to give the overall formulation weight, then simple percentages can be determined.

Embodiments of the present invention relate to compositions including from about 0 wt. % to about 100 wt. % polymer materials, from about 10 wt. % to about 100 wt. % of pulp materials, from about 0 wt. % to about 10 wt. % metal materials, from about 5 wt. % to about 100 wt. % other materials, and from about 0 wt. % to about 40 wt. % of a binding agent. In other embodiments, the compositions include from about 10 wt. % to about 100 wt. % polymer materials, from about 20 wt. % to about 100 wt. % of pulp materials, from about 1 wt. % to about 10 wt. % metal materials, from about 10 wt. % to about 50 wt. % other materials, and from about 0 wt. % to about 30 wt. % of a binding agent. In other embodiments, the compositions include from about 20 wt. % to about 100 wt. % polymer materials, from about 30 wt. % to about 70 wt. % of pulp materials, from about 1 wt. % to about 5 wt. % metal materials, from about 30 wt. % to about 100 wt. % other materials, and from about 0 wt. % to about 20 wt. % of a binding agent. In other embodiments, the compositions include from about 30 wt. % to about 100 wt. % polymer materials, from about 15 wt. % to about 70 wt. % of pulp materials, from about 0 wt. % to about 5 wt. % metal materials, and from about 0 wt. % to about 50 wt. % other materials and from about 0 wt. % to about 20 wt. % of a binding agent. In these formulations, the weight percentages are not confined to add up to 100%, but are relative amounts on a weight basis of the final composition. To determine the actual percentage in final composition, all of the weight percentages would be added up to give the overall formulation weight, then simple percentages can be determined.

Embodiments of the used healthcare material of this invention can also be expressed as compositions, where the component percentages sum to one hundred. Table I shows a number of possible formulations.

TABLE I

| Material | Formulation Ranges — Compositions | | | | | | | | | | | | | | | | | | |
|---|---|---|---|---|---|---|---|---|---|---|---|---|---|---|---|---|---|---|---|
| Polymer | 50 | 50 | 50 | 50 | 50 | 60 | 60 | 60 | 60 | 60 | 70 | 70 | 70 | 70 | 70 | 70 | 80 | 90 | 100 |
| Pulp | 50 | 40 | 40 | 25 | 20 | 40 | 30 | 30 | 20 | 15 | 30 | 15 | 10 | 20 | 15 | 20 | 10 | 0 | 0 |

TABLE I-continued

Formulation Ranges

| Material | Compositions | | | | | | | | | | | | | | | | | | |
|---|---|---|---|---|---|---|---|---|---|---|---|---|---|---|---|---|---|---|---|
| Metal | 0 | 10 | 5 | 0 | 10 | 0 | 10 | 5 | 0 | 10 | 0 | 0 | 10 | 10 | 10 | 5 | 1 | 1 | 0 |
| Other | 0 | 0 | 5 | 25 | 20 | 0 | 0 | 5 | 20 | 15 | 0 | 15 | 10 | 0 | 5 | 5 | 9 | 9 | 0 |
| Totals | 100 | 100 | 100 | 100 | 100 | 100 | 100 | 100 | 100 | 100 | 100 | 100 | 100 | 100 | 100 | 100 | 100 | 100 | 100 |

It should be recognized that these ranges are simply a set of component break downs and any other component make up can be used provided that if the composition is to be shaped, there is sufficient polymer material in the material to allow the compressed material to hold its shape under normal handling condition. In certain embodiments, the shaping can be performed with added heat so that the polymer materials can be softened or melted to increase shape integrity and improve crush strength of the shaped material.

Pre-Treatments

In certain embodiments, some or all of the input burnable fuel or a material to be included in the input burnable fuel is pre-treated to augment, change or remove components of a source material. Such pre-treatments can include, without limitation, heating to remove volatile components, washing to remove water soluble components, solvent washing or extraction to remove solvent extractible components, segregation at the generation site, pre-screening to remove materials having a certain size or construction for separate processing, partial pyrolysis to alter properties of the psig material, drying to remove water, crushing of large objects into smaller objects for subsequent processing, any other pretreatment designed to condition a particular psig material for use as a component in the psig materials used to produce the burnable fuels of this invention or any listed above in the Suitable Reagent section and any combination of these pretreatments.

Disinfecting Pre-Treatment

In certain embodiments and for certain materials, some or all of the input burnable fuel or materials that will ultimately be included in the input burnable fuel is disinfected and/or partially or completely sterilized using any methodology known to render a disinfected material, substantially free of any harmful pathogens. In certain embodiments of this invention, disinfecting and/or partial or complete sterilization is performed via autoclave sterilization. The psig used or waste material is placed in an autoclave at a temperature and pressure and for a time sufficient to render a disinfected material, free or substantially free of any harmful pathogens. The temperature is generally greater than at least 121° C., at a pressure of at least 15 psig and for a time of at least 30 minutes. In certain embodiments, the temperature is between about 121° C. and about 150° C., the pressure is between about 15 psig (103.4 Kpa) and about 50 psig (344.8 Kpa) and for a time between about 30 minutes and 60 minutes. In certain embodiments, the temperature is between about 121° C. and about 125° C., the pressure is between about 15 psig (103.4 Kpa) and about 25 psig (172.4 Kpa) and for a time between about 30 minutes and 60 minutes. In certain embodiments, the temperature is between about 121° C. and about 123° C., the pressure is between about 15 psig (103.4 Kpa) and about 20 psig (137.9 Kpa) and for a time between about 30 minutes and 40 minutes. Although specific embodiments have been set forth on temperature, pressure and time, higher temperatures and/or pressures can be used as well as shorter or longer times depending on a desired outcome or property of the disinfected material.

Direct Feed

In certain embodiments, the healthcare material can be fed directly into the kiln subsystem either in the calcining zone and/or the hot zone of the kiln subsystem. The healthcare material can be as is, sized, sized and shaped, pre-processed, pre-processed and sized, pre-processed and shaped, and/or pre-processed, sized and shaped or mixtures or combinations thereof. In embodiments in which the material is directly injected into the kiln subsystem, the materials can be designed to have a desired fuel value and residual ash composition suitable for generating a desired clinker and/or cement composition.

Particle Distribution

The used or waste material, regardless of its make up, is sized or sized and partially or completely homogenized or otherwise processed to reduce the particle size of the material and to form a particulate material having a certain particle size distribution and a certain degree of homogeny. The exact particle size distribution depends on the nature of the sizing or sizing and partially or completely homogenizing equipment used and on the screens or other size exclusion means used to control the particle size of the exiting particulate material and end use needs. The distribution of the present invention includes particles having a smallest dimension of between about 1.00 mm and about 100 mm. In certain embodiments, the particles have a smallest dimension of between about 6.35 mm and about 50.8 mm. In certain embodiments, the particles have a smallest dimension between about 12.7 mm and about 50.8 mm. In other embodiments, the particles have a smallest dimension between about 19.05 mm and about 50.8 mm. In other embodiments, the particles have a smallest dimension between about 19.0 mm and about 44.45 mm. In other embodiments, the particles have a smallest dimension between about 19.05 mm and about 38.1 mm. In other embodiments, the particles have a smallest dimension between about 19.05 mm and about 25.4 mm. The smallest dimension means that the particles are capable of passing through a screen of a desired screen size. The screen size range between openings of about 12.7 mm to about 50.8 mm. In other embodiments, the screen opening ranges between about 19.05 mm and about 44.45 mm. In other embodiments, the screen opening ranges between about 19.05 and about 38.1 mm.

The term partially homogenized in the context of the present invention means that the particulate material, although being composed of many different material components, has been mixed sufficiently that the bulk composition of components is within about 30% the same throughout the entire particulate material. In certain, embodiments, the partial homogeneity is within 20% or lower. The term completely homogenized in the context of the present invention means that the particulate material, although being composed of many different material components, has been mixed sufficiently that the bulk composition of components is within about 10% the same throughout the entire particulate material. In certain, embodiments, the partial homogeneity is within 5%.

Compressed Shapes

Optionally, the particulate material from the sizing process is then pressed, extruded or similarly processed into a shape to increase the bulk density of the material. The shape can be any shape including a cylindrical shape, a cubical shape, a rectangular solid shape, a spherical shape, an ellipsoidal shape, a tablet shape or any other compact 3D shape. The dimension of these shapes can range between about 0.5 cm and about 20 cm. In certain embodiments, the shape is substantially elongate shape having a diameter less than or equal to its length. The shape can be of a cylindrical type having sharp cut ends or rounded ends depending on the method used to make the elongate shape. Generally, the elongate shapes have a diameter between about 5 mm and about 20 mm and length of about 2 cm to about 10 cm. In certain embodiments, the elongate shape is cylindrical or substantially cylindrical. In other embodiments, the elongate shape has a diameter between about 10 mm and about 20 mm and a length between 3 cm and about 5 cm. In other embodiments, the elongate shape has a diameter between about 10 mm and about 15 mm and a length between 3 cm and about 5 cm. However, the shapes can be larger or smaller depending on end use. In other embodiment, the shape can have a diameter between about 0.5 cm and 20 cm. In other embodiment, the shape can have a diameter between about 0.5 cm and 20 cm and a length between about 0.5 cm and about 20 cm. In other embodiment, the shape can have a length, a width and a height between about 0.5 cm and 20 cm.

DETAILED DESCRIPTION OF THE DRAWINGS

Systems

Figure 1A:
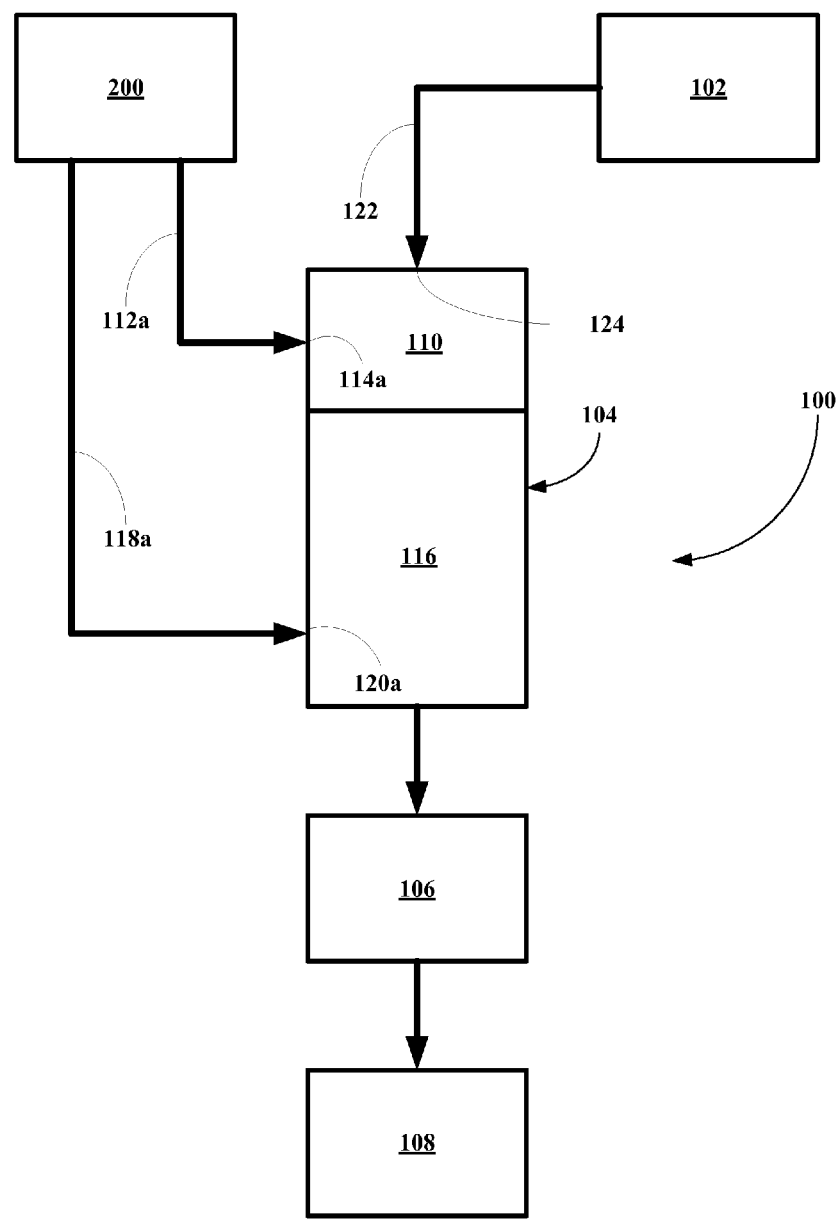
FIG. 1A depicts an embodiment of a cement production system of this invention.

Referring now to FIG. 1A, an embodiment of a cement plant of the present invention, generally 100, is shown to include a burnable fuel supply subsystem 200, a cement raw material supply subsystem 102, a kiln subsystem 104, a cooler subsystem 106, and a clinker storage subsystem 108. The burnable fuel supply subsystem 200 is adapted to supply a burnable fuel to a calcine zone 110 of the kiln subsystem 104 via a calcine zone conduit 112a into a calcine zone fuel input port 114a. The burnable fuel supply subsystem 200 is also adapted to supply a burnable fuel to a hot zone 116 of the kiln subsystem 104 via a hot zone conduit 118a into a hot zone fuel input port 120a. The cement raw material supply subsystem 102 is adapted to supply the cement raw material to the kiln subsystem 104 via a cement raw material conduit 122 into an input port 124. The burnable fuel can include one or more input burnable fuels, one or more pre-processed or pre-treated burnable fuels, and/or one or more shaped burnable fuels of this invention and optionally one or more traditional fuels. For additional information on cement plants the reader is referred to the following U.S. Pat. Nos. 7,390,357; 6,908,507; 6,807,916; 6,790,034; 6,749,681; 6,491,751; 6,120,172; 5,584,926; 5,156,676; 5,122,189; 4,682,948; 4,595,416; and 4,260,369; which are incorporated by reference as set forth in the last paragraph prior to the claims.

Figure 1B:
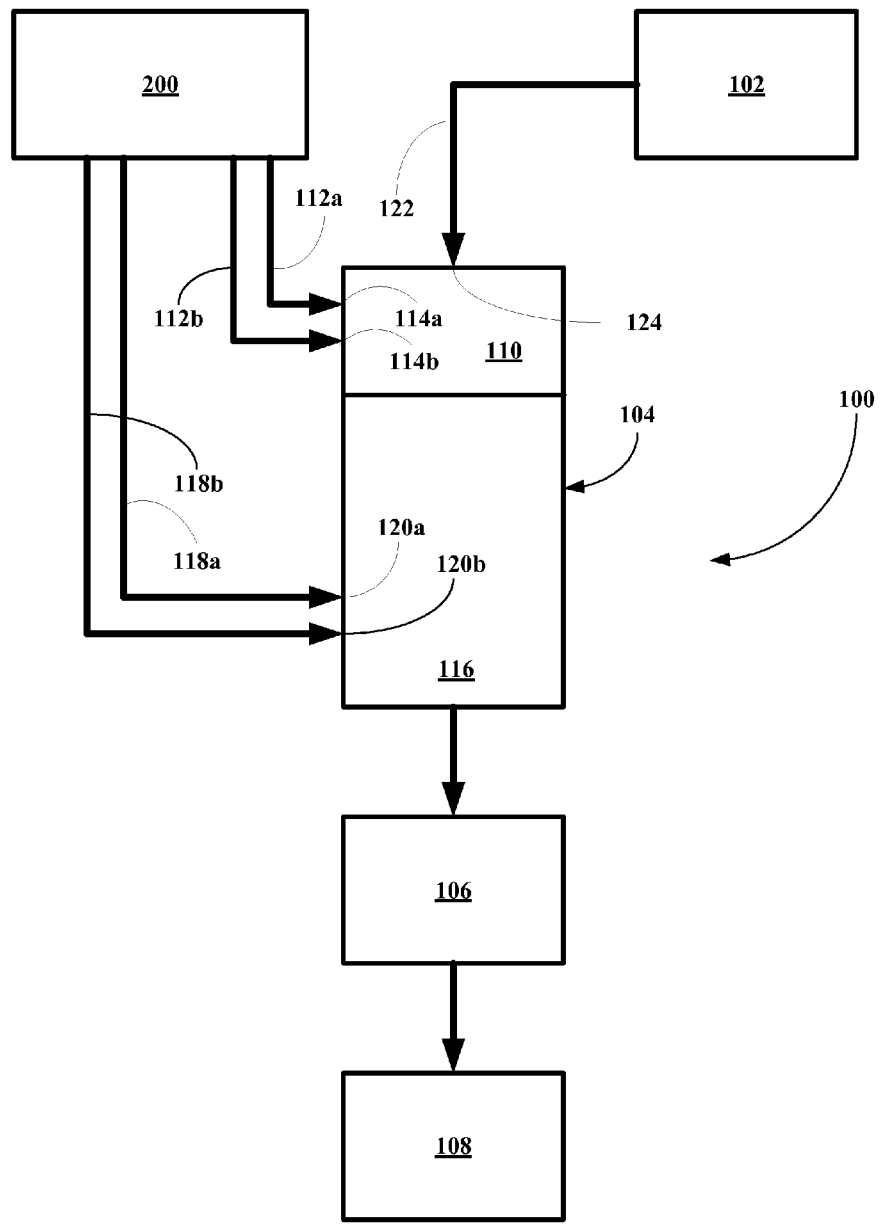
FIG. 1B depicts another embodiment of a cement production system of this invention.

Referring now to FIG. 1B, another embodiment of a cement plant of the present invention, generally 100, is shown to include a burnable fuel supply subsystem 200, a cement raw material supply subsystem 102, a kiln subsystem 104, a cooler subsystem 106, and a clinker storage subsystem 108. The burnable fuel supply subsystem 200 is adapted to supply a first calcining type of burnable fuel to the calcine zone 110 of the kiln subsystem 104 via a first calcine zone conduit 112a into a first calcine zone fuel input port 114a. The burnable fuel supply subsystem 200 is also adapted to supply a second calcining type of burnable fuel to the calcine zone 110 of the kiln subsystem 104 via a second calcine zone conduit 112b into a second calcine zone fuel input port 114b. The burnable fuel supply subsystem 200 is also adapted to supply a first sintering type of burnable fuel to a hot zone 116 of the kiln subsystem 104 via a first hot zone conduit 118a into a first hot zone fuel input port 120a. The burnable fuel supply subsystem 200 is also adapted to supply a second sintering type of burnable fuel to a hot zone 116 of the kiln subsystem 104 via a second hot zone conduit 118a into a second hot zone fuel input port 120a. The cement raw material supply subsystem 102 is adapted to supply the cement raw material to the kiln subsystem 104 via a cement raw material conduit 122 into an input port 124. The first burnable fuel can include one or more input burnable fuels, one or more pre-processed or pre-treated burnable fuels, one or more particulate burnable fuels, and/or one or more shaped burnable fuels of this invention. The second burnable fuel can include one or more input burnable fuels, one or more pre-processed or pre-treated burnable fuels, one or more particulate burnable fuels, and/or one or more shaped burnable fuels of this invention and optionally one or more traditional fuels.

Figure 1C:
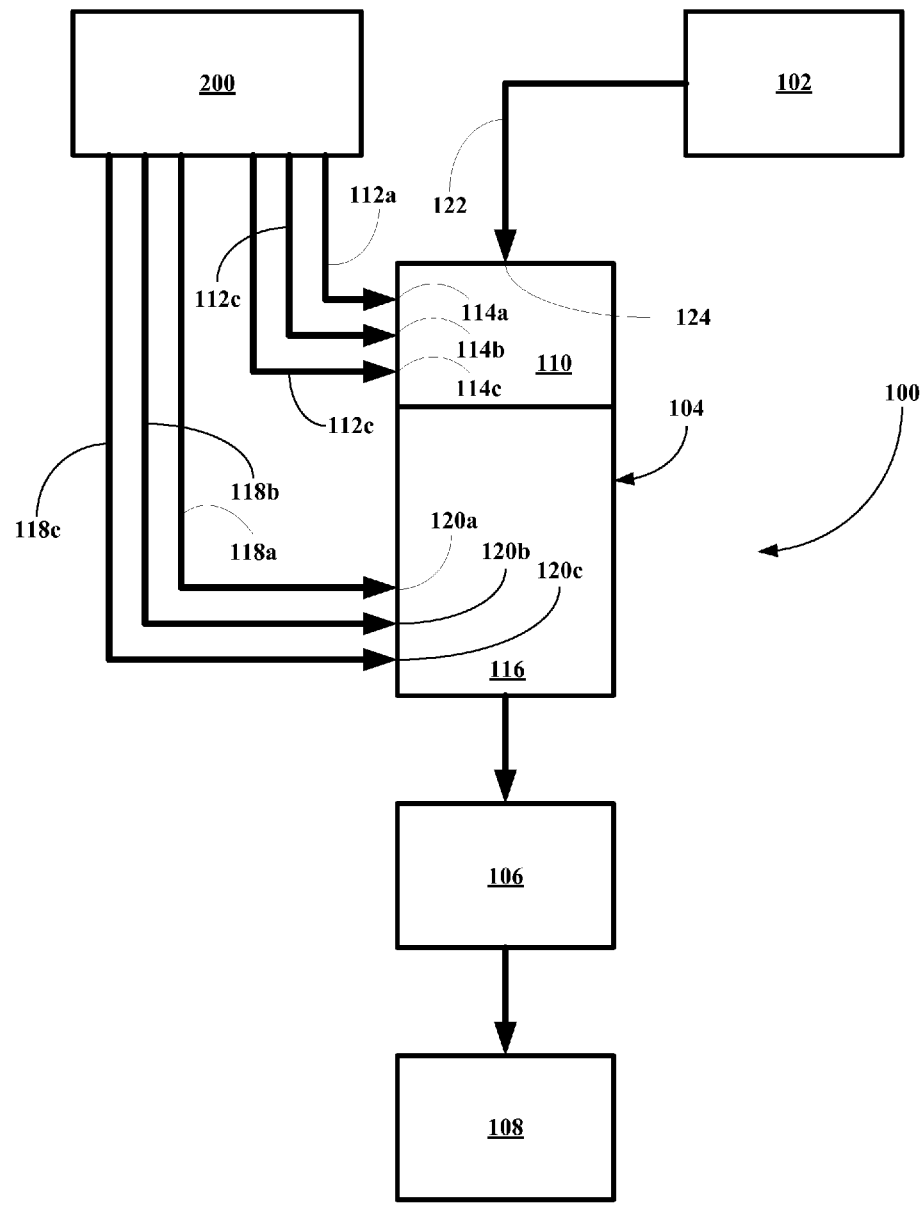
FIG. 1C depicts another embodiment of a cement production system of this invention.

Referring now to FIG. 1C, another embodiment of a cement plant of the present invention, generally 100, is shown to include a burnable fuel supply subsystem 200, a cement raw material supply subsystem 102, a kiln subsystem 104, a cooler subsystem 106, and a clinker storage subsystem 108. The burnable fuel supply subsystem 200 is adapted to supply a first calcining type of burnable fuel to the calcine zone 110 of the kiln subsystem 104 via a first calcine zone conduit 112a into a first calcine zone fuel input port 114a. The burnable fuel supply subsystem 200 is also adapted to supply a second calcining type of burnable fuel to the calcine zone 110 of the kiln subsystem 104 via a second calcine zone conduit 112b it to a second calcine zone fuel input port 114b. The burnable fuel supply subsystem 200 is also adapted to supply a third calcining type of burnable fuel to the calcine zone 110 of the kiln subsystem 104 via a third calcine zone conduit 112c into a second calcine zone fuel input port 114c. The burnable fuel supply subsystem 200 is also adapted to supply a first sintering type of burnable fuel to a hot zone 116 of the kiln subsystem 104 via a first hot zone conduit 118a into a second hot zone fuel input port 120a. The burnable fuel supply subsystem 200 is also adapted to supply a second sintering type of burnable fuel to a hot zone 116 of the kiln subsystem 104 via a second hot zone conduit 118a into a first hot zone fuel input port 120a. The burnable fuel supply subsystem 200 is also adapted to supply a third sintering type of burnable fuel to a hot zone 116 of the kiln subsystem 104 via a third hot zone conduit 118a into a third hot zone fuel input port 120a. The cement raw material supply subsystem 102 is adapted to supply the cement raw material to the kiln subsystem 104 via a cement raw material conduit 122 into an input port 124. The first burnable fuel can include one or more input burnable fuels, one or more pre-processed or pre-treated burnable fuels, one or more particulate burnable fuels, and/or one or more shaped burnable fuels of this invention. The second burnable fuel can include one or more input burnable fuels, one or more pre-processed or pre-treated burnable fuels, one or more particulate burnable fuels, and/or one or more shaped burnable fuels of this invention. The third burnable fuel can include one or more input burnable fuels, one or more pre-processed or pre-treated burnable fuels, one or more particulate burnable fuels, and/or one or more shaped burnable fuels of this invention and optionally one or more traditional fuels.

Basic Burnable Fuel Supply Subsystems

Referring now to FIG. 2A, an embodiment of a burnable fuel supply subsystem of the present invention, generally 200, is shown to include a material supply subsystem 202, where one or a plurality of source healthcare materials 204 are collected to form an input burnable fuel 206, which can be subsequently processed or used directly. The input burnable fuel 206 can include a variety of components as described above and can be adjusted to achieve a desired compositional makeup of components. The input burnable fuel 206, is then forwarded to a kiln subsystem 208, where a portion of the heat generated by combustion of the input burnable fuel 206 and its ash, along with the cement raw materials combine to produce a cement clinker composition.

Referring now to FIG. 2B, another embodiment of a burnable fuel supply subsystem of the present invention, generally 200, is shown to include a material supply subsystem 202, where one or a plurality of source healthcare materials 204 are collected to form an input burnable fuel 206. The input burnable fuel 206 can include a variety of components as described above and can be adjusted to achieve a desired compositional makeup of components. The input burnable fuel 206 is then sized or sized and partially or completely homogenized in a sizing or sizing and homogenizing subsystem 210, where the input burnable fuel 206 is shredded, chopped, shattered, or broken to produce a particulate burnable fuel 212 having a desired particle size distribution. The particulate burnable fuel 212 is then forwarded to a storage subsystem 214, where the particulate burnable fuel 212 is stored for subsequent use as a fuel or fuel component.

Referring now to FIG. 2C, another embodiment of a burnable fuel supply subsystem of the present invention, generally 200, is shown to include a material supply subsystem 202, where one or a plurality of source healthcare materials 204 are collected to form an input burnable fuel 206. The input burnable fuel 206 can include a variety of components as described above and can be adjusted to achieve a desired compositional makeup of components. The input burnable fuel 206 is then sized or sized and partially or completely homogenized in a sizing or sizing and homogenizing subsystem 210, where the input burnable fuel 206 is shredded, chopped, shattered, or broken to produce a particulate burnable fuel 212 having a desired particle size distribution. The particulate burnable fuel 212 is then forwarded to a kiln subsystem 208, where a portion of the heat generated by combustion of the particulate burnable fuel 212 and its ash, along with the cement raw materials combine to produce a cement clinker composition.

Referring now to FIG. 2D, another embodiment of a burnable fuel supply subsystem of the present invention, generally 200, is shown to include a material supply subsystem 202, where one or a plurality of source healthcare materials 204 are collected to form an input burnable fuel 206. The input burnable fuel 206 can include a variety of components as described above and can be adjusted to achieve a desired compositional makeup of components. The input burnable fuel 206 is then sized or sized and partially or completely homogenized in a sizing or sizing and homogenizing subsystem 210, where the input burnable fuel 206 is shredded, chopped, shattered, or broken to produce a particulate burnable fuel 212 having a desired particle size distribution. The particulate burnable fuel 212 is then forwarded to a packaging subsystem 216, where the particulate burnable fuel 212 is placed in containers to produce a containerized particulate burnable fuel 218 for ease of shipment or transport and for direct use as a fuel to produce a useable form of energy, to produce a useable product, or to otherwise use the heat derived therefrom. The containerized particulate burnable fuel 218 is then forwarded to a storage subsystem 214, where the containerized particulate burnable fuel 218 is stored for subsequent use as a fuel or fuel component.

Referring now to FIG. 2E, another embodiment of a burnable fuel supply subsystem of the present invention, generally 200, is shown to include a material supply subsystem 202, where one or a plurality of source healthcare materials 204 are collected to form an input burnable fuel 206. The input burnable fuel 206 can include a variety of components as described above and can be adjusted to achieve a desired compositional makeup of components. The input burnable fuel 206 is then sized or sized and partially or completely homogenized in a sizing or sizing and homogenizing subsystem 210, where the input burnable fuel 206 is shredded, chopped, shattered, or broken to produce a particulate burnable fuel 212 having a desired particle size distribution. The particulate burnable fuel 212 is then forwarded to a packaging subsystem 216, where the particulate burnable fuel 212 is placed in containers to produce a containerized particulate burnable fuel 218. The containerized particulate burnable fuel 218 is then forwarded to a kiln subsystem 208, where a portion of the heat generated by combustion of the containerized particulate burnable fuel 218 and its ash, along with the cement raw materials combine to produce a cement clinker composition.

Referring now to FIG. 2F, another embodiment of a burnable fuel supply subsystem of the present invention, generally 200, is shown to include a material supply subsystem 202, where one or a plurality of source healthcare materials 204 are collected to form an input burnable fuel 206. The input burnable fuel 206 can include a variety of components as described above and can be adjusted to achieve a desired compositional makeup of components. The input burnable fuel 206 is then sized or sized and partially or completely homogenized in a sizing or sizing and homogenizing subsystem 210, where the input burnable fuel 206 is shredded, chopped, shattered, or broken to produce a particulate burnable fuel 212 having a desired particle size distribution. The particulate burnable fuel 212 is then forwarded to a shaping subsystem 220, where the particulate burnable fuel 212 is shaped into a compact shape to produce a shaped burnable fuel 222. The shaped burnable fuel 222 is then forwarded to a storage subsystem 214, where the shaped burnable fuel 222 is stored for subsequent use as a fuel or fuel component.

Referring now to FIG. 2G, another embodiment of a burnable fuel supply subsystem of the present invention, generally 200, is shown to include a material supply subsystem 202, where one or a plurality of source healthcare materials 204 are collected to form an input burnable fuel 206. The input burnable fuel 206 can include a variety of components as described above and can be adjusted to achieve a desired compositional makeup of components. The input burnable fuel 206 is then sized or sized and partially or completely homogenized in a sizing or sizing and homogenizing subsystem 210, where the input burnable fuel 206 is shredded, chopped, shattered, or broken to produce a particulate burnable fuel 212 having a desired particle size distribution. The particulate burnable fuel 212 is then forwarded to a shaping subsystem 220, where the particulate burnable fuel 212 is shaped into a compact shape to produce a shaped burnable fuel 222. The shaped burnable fuel 222 is then forwarded to a kiln subsystem 208, where a portion of the heat generated by combustion of the shaped burnable fuel 222 and its ash, along with the cement raw materials combine to produce a cement clinker composition.

Referring now to FIG. 2H, another embodiment of a burnable fuel supply subsystem of the present invention, generally 200, is shown to include a material supply subsystem 202, where one or a plurality of source healthcare materials 204 are collected to form an input burnable fuel 206. The input burnable fuel 206 can include a variety of components as described above and can be adjusted to achieve a desired compositional makeup of components. The input burnable fuel 206 is then sized or sized and partially or completely homogenized in a sizing or sizing and homogenizing subsystem 210, where the input burnable fuel 206 is shredded, chopped, shattered, or broken to produce a particulate burnable fuel 212 having a desired particle size distribution. The particulate burnable fuel 212 is then forwarded to a shaping subsystem 220, where the particulate burnable fuel 212 is shaped into a compact shape to produce a shaped burnable fuel 222. The shaped burnable fuel 222 is then forwarded to a packaging subsystem 216, where the shaped burnable fuel 222 is placed in containers to produce a containerized shaped burnable fuel 224. The containerized shaped burnable fuel 224 is then forwarded to a storage subsystem 214, where the containerized shaped burnable fuel 224 is stored for subsequent use as fuel or fuel component.

Referring now to FIG. 2I, another embodiment of a burnable fuel supply subsystem of the present invention, generally 200, is shown to include a material supply subsystem 202, where one or a plurality of source healthcare materials 204 are collected to form an input burnable fuel 206. The input burnable fuel 206 can include a variety of components as described above and can be adjusted to achieve a desired compositional makeup of components. The input burnable fuel 206 is then sized or sized and partially or completely homogenized in a sizing or sizing and homogenizing subsystem 210, where the input burnable fuel 206 is shredded, chopped, shattered, or broken to produce a particulate burnable fuel 212 having a desired particle size distribution. The particulate burnable fuel 212 is then forwarded to a shaping subsystem 220, where the particulate burnable fuel 212 is shaped into a compact shape to produce a shaped burnable fuel 222. The shaped burnable fuel 222 is then forwarded to a packaging subsystem 216, where the shaped burnable fuel 222 is placed in containers to produce a containerized shaped burnable fuel 224. The containerized shaped burnable fuel 224 is then forwarded to a kiln subsystem 208, where a portion of the heat generated by combustion of the containerized shaped burr able fuel 224 and its ash, along with the cement raw materials combine to produce a cement clinker composition.

Burnable Fuel Supply Subsystems with Pre-Processing or Pre-Treating Subsystem

Referring now to FIG. 3A, another embodiment of a burnable fuel supply subsystem of the present invention, generally 300, is shown to include a material supply subsystem 302, where one or a plurality of source healthcare materials 304 are collected to form an input burnable fuel 306. The input burnable fuel 306 can include a variety of components as described above and can be adjusted to achieve a desired compositional makeup of components. The input burnable fuel 306 is then pre-processed or pre-treated in a pre-processing or pre-treating subsystem 308, where the input burnable fuel 306 is pre-processed in one or a plurality of pre-processing and/or pre-treating steps to form a pre-processed burnable fuel 310. The pre-processed or pre-treated burnable fuel 310 is then forwarded directly to a kiln subsystem 312, where a portion of the heat generated by combustion of the pre-processed or pre-treated burnable fuel 310 and its ash, along with the cement raw materials combine to produce a cement clinker composition.

Referring now to FIG. 3B, another embodiment of a burnable fuel supply subsystem of the present invention, generally 300, is shown to include a material supply subsystem 302, where one or a plurality of source healthcare materials 304 are collected to form an input burnable fuel 306. The input burnable fuel 306 can include a variety of components as described above and can be adjusted to achieve a desired compositional makeup of components. The input burnable fuel 306 is then pre-processed in a pre-processing or pre-treating subsystem 308, where the input burnable fuel 306 is pre-processed or pre-treated in one or a plurality of pre-processing or pre-treating steps to form a pre-processed or pre-treated burnable fuel 310. The pre-processed or pre-treated burnable fuel 310 is then sized or sized and partially or completely homogenized in a sizing or sizing and homogenizing subsystem 314, where the pre-processed or pre-treated burnable fuel 310 is shredded, chopped, shattered, or broken to produce a particulate burnable fuel 316 having a desired particle size distribution. The particulate burnable fuel 316 is then forwarded to a storage subsystem 318, where the particulate burnable fuel 316 is stored for subsequent use as a fuel or fuel component.

Referring now to FIG. 3C, another embodiment of a burnable fuel supply subsystem of the present invention, generally 300, is shown to include a material supply subsystem 302, where one or a plurality of source healthcare materials 304 are collected to form an input burnable fuel 306. The input burnable fuel 306 can include a variety of components as described above and can be adjusted to achieve a desired compositional makeup of components. The input burnable fuel 306 is then pre-processed in a pre-processing subsystem 308, where the input burnable fuel 306 is pre-processed in one or a plurality of pre-processing steps to form a pre-processed or pre-treated burnable fuel 310. The pre-processed or pre-treated burn able fuel 310 is then sized or sized and partially or completely homogenized in a sizing or sizing and homogenizing subsystem 314, where the pre-processed or pre-treated burnable fuel 310 is shredded, chopped, shattered, or broken to produce a particulate burnable fuel 316 having a desired particle size distribution. The particulate burnable fuel 316 is then forwarded to a kiln subsystem 312, where a portion of the heat generated by combustion of the particulate burnable fuel 316 and its ash, along with the cement raw materials combine to produce a cement clinker composition.

Referring now to FIG. 3D, another embodiment of a burnable fuel supply subsystem of the present invention, generally 300, is shown to include a material supply subsystem 302, where one or a plurality of source healthcare materials 304 are collected to form an input burnable fuel 306. The input burnable fuel 306 can include a variety of components as described above and can be adjusted to achieve a desired compositional makeup of components. The input burnable fuel 306 is then pre-processed in a pre-processing subsystem 308, where the input burnable fuel 306 is pre-processed in one or a plurality of pre-processing steps to form a pre-processed or pre-treated burnable fuel 310. The pre-processed or pre-treated burnable fuel 310 is then sized or sized and partially or completely homogenized in a sizing or sizing and homogenizing subsystem 314, where the pre-processed or pre-treated burnable fuel 310 is shredded, chopped, shattered, or broken to produce a particulate burnable fuel 316 having a desired particle size distribution. The particulate burnable fuel 316 is then forwarded to a packaging subsystem 320, where the particulate burnable fuel 316 is placed in containers to produce a packaged or containerized particulate burnable fuel 322. The packaged or containerized particulate burnable fuel 322 is then forwarded to a storage subsystem 318, where the packaged or containerized particulate burnable fuel 322 is stored for subsequent use as a fuel or fuel component.

Referring now to FIG. 3E, another embodiment of a burnable fuel supply subsystem of the present invention, generally 300, is shown to include a material supply subsystem 302, where one or a plurality of source materials 304 are collected to form an input burnable fuel 306. The input healthcare material 306 can include a variety of component is as described above and can be adjusted to achieve a desired compositional makeup of components. The input burnable fuel 306 is then pre-processed in a pre-processing subsystem 308, where the in put burnable fuel 306 is pre-processed in one or a plurality of pre-processing steps to form a pre-processed or pre-treated burnable fuel 310. The pre-processed or pre-treated burnable fuel 310 is then sized or sized and partially or completely homogenized in a sizing or sizing and homogenizing subsystem 314, where the pre-processed or pre-treated burnable fuel 310 is shredded, chopped, shattered, or broken to produce a particulate burnable fuel 316 having a desired particle size distribution. The particulate burnable fuel 316 is then forwarded to a packaging subsystem 320, where the particulate burnable fuel 316 is placed in containers to produce a packaged or containerized particulate burnable fuel 322. The packaged or containerized particulate burnable fuel 322 is then forwarded to a kiln subsystem 312, where a portion of the heat generated by combustion of the packaged or containerized particulate burnable fuel 322 and its ash, along with the cement raw materials combine to produce a cement clinker composition.

Referring now to FIG. 3F, another embodiment of a burnable fuel supply subsystem of the present invention, generally 300, is shown to include a material supply subsystem 302, where one or a plurality of source healthcare materials 304 are collected to form an input burnable fuel 306. The input burnable fuel 306 can include a variety of components as described above and can be adjusted to achieve a desired compositional makeup of components. The input burnable fuel 306 is then pre-processed in a pre-processing subsystem 308, where the input burnable fuel 306 is pre-processed in one or a plurality of pre-processing steps to form a pre-processed or pre-treated burnable fuel 310. The pre-processed or pre-treated burr able fuel 310 is then sized or sized and partially or completely homogenized in a sizing or sizing and homogenizing subsystem 314, where the pre-processed or pre-treated burnable fuel 310 is shredded, chopped, shattered, or broken to produce a particulate burnable fuel 316 having a desired particle size distribution. The particulate burnable fuel 316 is then forwarded to a shaping subsystem. 324, where the particulate burnable fuel 316 is shaped into a compact shape to produce a shaped burnable fuel 326. The shaped burnable fuel 326 is then forwarded to a storage subsystem 318, where the shaped burnable fuel 326 is stored for subsequent use as a fuel or fuel component.

Referring now to FIG. 3G, another embodiment of a burnable fuel supply subsystem of the present invention, generally 300, is shown to include a material supply subsystem 302, where one or a plurality of source materials 304 are collected to form an input burnable fuel 306. The input healthcare material 306 can include a variety of components as described above and can be adjusted to achieve a desired compositional makeup of components. The input burnable fuel 306 is then pre-processed in a pre-processing subsystem 308, where the input burnable fuel 306 is pre-processed in one or a plurality of pre-processing steps to form a pre-processed or pre-treated burnable fuel 310. The pre-processed or pre-treated burnable fuel 310 is then sized or sized and partially or completely homogenized in a sizing or sizing and homogenizing subsystem 314, where the pre-processed or pre-treated burnable fuel 310 is shredded, chopped, shattered, or broken to produce a particulate burnable fuel 316 having a desired particle size distribution. The particulate burnable fuel 316 is then forwarded to a shaping subsystem 324, where the particulate burnable fuel 316 is shaped into a compact shape to produce a shaped burnable fuel 326. The shaped burnable fuel 326 is then forwarded to a kiln subsystem 312, where a portion of the heat generated by combustion of the shaped burnable fuel 326 and its ash, along with the cement raw materials combine to produce a cement clinker composition.

Referring now to FIG. 3H, another embodiment of a burnable fuel supply subsystem of the present invention, generally 300, is shown to include a material supply subsystem 302, where one or a plurality of source materials 304 are collected to form an input burnable fuel 306. The input healthcare material 306 can include a variety of components as described above and can be adjusted to achieve a desired compositional makeup of components. The input burnable fuel 306 is then pre-processed in a pre-processing subsystem 308, where the input burnable fuel 306 is pre-processed in one or a plurality of pre-processing steps to form a pre-processed or pre-treated burnable fuel 310. The pre-processed or pre-treated burnable fuel 310 is then sized or sized and partially or completely homogenized in a sizing or sizing and homogenizing subsystem 314, where the pre-processed or pre-treated burnable fuel 310 is shredded, chopped, shattered, or broken to produce a particulate burnable fuel 316 having a desired particle size distribution. The particulate burnable fuel 316 is then forwarded to a shaping subsystem 324, where the particulate burnable fuel 316 is shaped into a compact shape to produce a shaped burnable fuel 326. The shaped burnable fuel 326 is then forwarded to a packaging subsystem 320, where the shaped burnable fuel 326 is placed in containers to produce a packaged or containerized shaped burnable fuel 328. The packaged or containerized shaped burnable fuel 328 is then forwarded to a storage subsystem 318, where the packaged or containerized shaped burnable fuel 328 is stored for subsequent use as a fuel or fuel component.

Referring now to FIG. 3I, another embodiment of a burnable fuel supply subsystem of the present invention, generally 300, is shown to include a material supply subsystem 302, where one or a plurality of source materials 304 are collected to form an input burnable fuel 306. The input healthcare material 306 can include a variety of components as described above and can be adjusted to achieve a desired compositional makeup of components The input burnable fuel 306 is then pre-processed in a pre-processing subsystem 308, where the in put burnable fuel 306 is pre-processed in one or a plurality of pre-processing steps to form a pre-processed or pre-treated burnable fuel 310. The pre-processed or pre-treated burnable fuel 310 is then sized or sized and partially or completely homogenized in a sizing or sizing and homogenizing subsystem 314, where the pre-processed or pre-treated burnable fuel 310 is shredded, chopped, shattered, or broken to produce a particulate burnable fuel 316 having a desired particle size distribution. The particulate burnable fuel 316 is then forwarded to a shaping subsystem 324, where the particulate burnable fuel 316 is shaped into a compact shape to produce a shaped burnable fuel 326. The shaped burnable fuel 326 is then forwarded to a packaging subsystem 320, where the shaped burnable fuel 326 is placed in containers to produce a packaged or containerized shaped burnable fuel 328. The packaged or containerized shaped burnable fuel 328 is then forwarded to a kiln subsystem 312, where a portion of the heat generated by combustion of the packaged or containerized shaped burnable fuel 328 and its ash, along with the cement raw materials combine to produce a cement clinker composition.

Burnable Fuel Supply Subsystems with Two Source Healthcare Materials

Referring now to FIG. 4A, another embodiment of a burnable fuel supply subsystem of the present invention, generally 400, is shown to include a first material supply subsystem 402, where one or a plurality of first source healthcare materials 404 are collected to form a first input burnable fuel 406. The system 400 also includes a second material supply subsystem 408, where one or a plurality of second healthcare source healthcare materials 410 are collected to form a second input burnable fuel 412. The first and second input burnable fuels 406 and 412 can include a variety of components as described above and can be adjusted to achieve a desired compositional makeup of components. The second input burnable fuel 412 is then pre-processed in a pre-processing or pre-treating subsystem 414, where the second input burnable fuel 406 is pre-processed in one or a plurality of pre-processing or pre-treating steps to form a pre-processed or pre-treated burnable fuel 416. The first input burnable fuel 406 and the pre-processed or pre-treated burnable fuel 416 are then combined and forwarded to a kiln subsystem 418, where a portion of the heat generated by combustion of the first input burnable fuel 406 and the pre-processed or pre-treated burnable fuel 416 and their ash, along with the cement raw materials combine to produce a cement clinker composition.

Referring now to FIG. 4B, another embodiment of a burnable fuel supply subsystem of the present invention, generally 400, is shown to include a first material supply subsystem 402, where one or a plurality of first source healthcare materials 404 are collected to form a first input burnable fuel 406. The system 400 also includes a second material supply subsystem 408, where one or a plurality of second source healthcare materials 410 are collected to form a second input burnable fuel 412. The first input burnable fuel 406 and the pre-processed or pre-treated burnable fuel 416 are then combined and forwarded to a sizing or sizing and homogenizing subsystem 420, where the fuels 406 and 416 are shredded, chopped, shattered, or broken to produce a particulate burnable fuel 422 having a desired particle size distribution. The particulate burnable fuel 422 is then forwarded to a storage subsystem 424, where the particulate burnable fuel 422 is stored for subsequent use as a fuel or fuel component.

Referring now to FIG. 4C, another embodiment of a burnable fuel supply subsystem of the present invention, generally 400, is shown to include a first material supply subsystem 402, where one or a plurality of first source healthcare materials 404 are collected to form a first input burnable fuel 406. The system 400 also includes a second material supply subsystem 408, where one or a plurality of second source healthcare materials 410 are collected to form a second input burnable fuel 412. The first and second input burnable fuels 406 and 412 can include a variety of components as described above and can be adjusted to achieve a desired compositional makeup of components. The second input burnable fuel 412 is then pre-processed in a pre-processing subsystem 414, where the second input burnable fuel 412 is pre-processed in one or a plurality of pre-processing steps to form a pre-processed or pre-treated burnable fuel 416. The first input burnable fuel 406 and the pre-processed or pre-treated burnable fuel 416 are then combined and forwarded to a sizing or sizing and homogenizing subsystem 420, where the fuels 406 and 416 are shredded, chopped, shattered, or broken to produce a particulate burnable fuel 422 having a desired particle size distribution. The particulate burnable fuel 422 is then forwarded to a kiln subsystem 418, where a portion of the heat generated by combustion of the particulate burnable fuel 422 and its ash, along with the cement raw materials combine to produce a clinker composition.

Referring now to FIG. 4D, another embodiment of a burnable fuel supply subsystem of the present invention, generally 400, is shown to include a first material supply subsystem 402, where one or a plurality of first source healthcare materials 404 are collected to form a first input burnable fuel 406. The system 400 also includes a second material supply subsystem 408, where one or a plurality of second source healthcare materials 410 are collected to form a second input burnable fuel 412. The first and second input burnable fuels 406 and 412 can include a variety of components as described above and can be adjusted to achieve a desired compositional makeup of components. The second input burnable fuel 412 is then pre-processed in a pre-processing subsystem 414, where the second input burnable fuel 406 is pre-processed in one or a plurality of pre-processing steps to form a pre-processed or pre-treated burnable fuel 416. The first input burnable fuel 406 and the pre-processed or pre-treated burnable fuel 416 are then combined and forwarded to a sizing or sizing and homogenizing subsystem 420, where the fuels 406 and 416 are shredded, chopped, shattered, or broken to produce a particulate burnable fuel 422 having a desired particle size distribution. The particulate burnable fuel 422 is then forwarded to a packaging subsystem 426, where the particulate burnable fuel 422 is placed in containers to produce a packaged or containerized particulate burnable fuel 428. The packaged or containerized particulate burnable fuel 428 is then forwarded to a storage subsystem 424, where the packaged or containerized particulate burnable fuel 428 is stored for subsequent use as a fuel or fuel component.

Referring now to FIG. 4E, another embodiment of a burnable fuel supply subsystem of the present invention, generally 400, is shown to include a first material supply subsystem 402, where one or a plurality of first source healthcare materials 404 are collected to form a first input burnable fuel 406. The system 400 also includes a second material supply subsystem 408, where one or a plurality of second source healthcare materials 410 are collected to form a second input burnable fuel 412. The first and second input burnable fuels 406 and 412 can include a variety of components as described above and can be adjusted to achieve a desired compositional makeup of components. The second input burnable fuel 412 is then pre-processed is a pre-processing subsystem 414, where the second input burnable fuel 406 is pre-processed in one or a plurality of pre-processing steps to form a pre-processed or pre-treated burnable fuel 416. The first input burnable fuel 406 and the pre-processed or pre-treated burnable fuel 416 are then combined and forwarded to a sizing or sizing and homogenizing subsystem 420, where the fuels 406 and 416 are shredded, chopped, shattered, or broken to produce a particulate burnable fuel 422 having a desired particle size distribution. The particulate burnable fuel 422 is then forwarded to a packaging subsystem 426, where the particulate burnable fuel 422 is placed in containers to produce a packaged or containerized particulate burnable fuel 428. The packaged or containerized particulate burnable fuel 428 is then forwarded to a kiln subsystem 418, where a portion of the heat generated by combustion of the packaged or containerized particulate burnable fuel 428 and its ash, along with the cement raw materials combine to produce a cement clinker composition.

Referring now to FIG. 4F, another embodiment of a burnable fuel supply subsystem of the present invention, generally 400, is shown to include a first material supply subsystem 402, where one or a plurality of first source healthcare materials 404 are collected to form a first input burnable fuel 406. The system 400 also includes a second material supply subsystem 408, where one or a plurality of second source healthcare materials 410 are collected to form a second input burnable fuel 412. The first and second input burnable fuels 406 and 412 can include a variety of components as described above and can be adjusted to achieve a desired compositional makeup of components. The second input burnable fuel 412 is then pre-processed in a pre-processing subsystem 414, where the second input burnable fuel 406 is pre-processed in one or a plurality of pre-processing steps to form a pre-processed or pre-treated burnable fuel 416. The first input burnable fuel 406 and the pre-processed or pre-treated burnable fuel 416 are then combined and forwarded to a sizing or sizing and homogenizing subsystem 420, where the fuels 406 and 416 are shredded, chopped, shattered, or broken to produce a particulate burnable fuel 422 having a desired particle size distribution. The particulate burnable fuel 422 is then forwarded to a shaping subsystem 430, where the particulate burnable fuel 422 is shaped into a compact shape to produce a shaped burnable fuel 432. The shaped burnable fuel 432 is then forwarded to a storage subsystem 424, where the shaped burnable fuel 432 is stored for subsequent use as a fuel or fuel component.

Referring now to FIG. 4G, another embodiment of a burnable fuel supply subsystem of the present invention, generally 400, is shown to include a first material supply subsystem 402, where one or a plurality of first source healthcare materials 404 are collected to form a first input burnable fuel 406. The system 400 also includes a second material supply subsystem 408, where one or a plurality of second source healthcare materials 410 are collected to form a second input burnable fuel 412. The first and second input burnable fuels 406 and 412 can include a variety of components as described above and can be adjusted to achieve a desired compositional makeup of components. The second input burnable fuel 412 is then pre-processed iii a pre-processing subsystem 414, where the second input burnable fuel 406 is pre-processed in one or a plurality of pre-processing steps to form a pre-processed or pre-treated burnable fuel 416. The first input burnable fuel 406 and the pre-processed or pre-treated burnable fuel 416 are then combined and forwarded to a sizing or sizing and homogenizing subsystem 420, where the fuels 406 and 416 are shredded, chopped, shattered, or broken to produce a particulate burnable fuel 422 having a desired particle size distribution. The particulate burnable fuel 422 is then forwarded to a shaping subsystem 430, where the particulate burnable fuel 422 is shaped into a compact shape to produce a shaped burnable fuel 432. The shaped burnable fuel 432 is then forwarded to a kiln subsystem 418, where a portion of the heat generated by combustion of the shaped burnable fuel 432 and its ash, along with the cement raw materials combine to produce a cement clinker composition.

Referring now to FIG. 4H, another embodiment of a burnable fuel supply subsystem of the present invention, generally 400, is shown to include a first material supply subsystem 402, where one or a plurality of first source healthcare materials 404 are collected to form a first input burnable fuel 406. The system 400 also includes a second material supply subsystem 408, where one or a plurality of second source healthcare materials 410 are collected to form a second input burnable fuel 412. The first and second input burnable fuels 406 and 412 can include a variety of components as described above and can be adjusted to achieve a desired compositional makeup of components. The second input burnable fuel 412 is then pre-processed in a pre-processing subsystem 414, where the second input burnable fuel 406 is pre-processed in one or a plurality of pre-processing steps to form a pre-processed or pre-treated burnable fuel 416. The first input burnable fuel 406 and the pre-processed or pre-treated burnable fuel 416 are then combined and forwarded to a sizing or sizing and homogenizing subsystem 420, where the fuels 406 and 416 are shredded, chopped, shattered, or broken to produce a particulate burnable fuel 422 having a desired particle size distribution. The particulate burnable fuel 422 is then forwarded to a shaping subsystem 430, where the particulate burnable fuel 422 is shaped into a compact shape to produce a shaped burnable fuel 432. The shaped burnable fuel 432 is then forwarded to a packaging subsystem 426, where the shaped burnable fuel 432 is placed in containers to produce a packaged or containerized shaped burnable fuel 434. The packaged or containerized shaped burnable fuel 434 is then forwarded to a storage subsystem 424, where the packaged or containerized shaped burnable fuel 434 is stored for subsequent use as a fuel or fuel component.

Referring now to FIG. 4I, another embodiment of a burnable fuel supply subsystem of the present invention, generally 400, is shown to include a first material supply subsystem 402, where one or a plurality of first source healthcare materials 404 are collected to form a first input burnable fuel 406. The system 400 also includes a second material supply subsystem 408, where one or a plurality of second source healthcare materials 410 are collected to form a second input burnable fuel 412. The first and second input burnable fuels 406 and 412 can include a variety of components as described above and can be adjusted to achieve a desired compositional makeup of components. The second input burnable fuel 412 is then pre-processed in a pre-processing subsystem 414, where the second input burnable fuel 406 is pre-processed in one or a plurality of pre-processing steps to form a pre-processed or pre-treated burnable fuel 416. The first input burnable fuel 406 and the pre-processed or pre-treated burnable fuel 416 are then combined and forwarded to a sizing or sizing and homogenizing subsystem 420, where the fuels 406 and 416 are shredded, chopped, shattered, or broken to produce a particulate burnable fuel 422 having a desired particle size distribution. The particulate burnable fuel 422 is then forwarded to a shaping subsystem 430, where the particulate burnable fuel 422 is shaped into a compact shape to produce a shaped burnable fuel 432. The shaped burnable fuel 432 is then forwarded to a packaging subsystem 426, where the shaped burnable fuel 432 is placed in containers to produce a packaged or containerized shaped burnable fuel 434. The packaged or containerized shaped burnable fuel 434 is then forwarded to a kiln subsystem 418, where a portion of the heat generated by combustion or the packaged or containerized shaped burnable fuel 434 and its ash, along with the cement raw materials combine to produce a cement clinker composition.

Basic Methods Fix all of 5 Series Drawings

Referring now to FIG. 5A, an embodiment of a method of the present invention, generally 500, is shown to include a supplying step 502 of providing a healthcare material as a burnable fuel comprising one or a plurality of source healthcare materials having a certain component make-up. The method 500 also includes a burning step 504, where the healthcare material is burned to produce a cement clinker composition.

Referring now to FIG. 5B, an embodiment of a method of the present invention, generally 500, is shown to include a supplying step 502 of providing an input material comprising one or a plurality of source healthcare materials having a certain component make-up. The method 500 also includes a sizing or sizing and homogenizing step 506, where the input material is sized or sized and partially or completely homogenized to form a particulate burnable fuel. The method 500 also includes a storing step 508, where the particulate burnable fuel is stored in a storage subsystem for later use, shipment or transportation.

Referring now to FIG. 5C, another embodiment of a method of the present invention, generally 500, is shown to include a supplying step 502 of providing an input material comprising one or a plurality of source healthcare materials having a certain component make-up. The method 500 also includes a sizing or sizing and homogenizing step 506, where the input material is sized or sized and partially or completely homogenized to form a particulate burnable fuel. The method 500 also includes a burning step 504, where the particulate burnable fuel is burned to produce a cement clinker composition.

Referring now to FIG. 5D, another embodiment of a method of the present invention, generally 500, is shown to include a supplying step 502 of providing an input material comprising one or a plurality of source healthcare materials having a certain component make-up. The method 500 also includes a sizing or sizing and homogenizing step 506, where the input material is sized or sized and partially or completely homogenized to form a particulate burnable fuel. The method 500 also includes a packaging step 510, where the particulate burnable fuel is packaged to form a packaged or containerized particulate burnable fuel. The method 500 also includes a storing step 508, where the packaged or containerized, particulate burnable fuel is stored in a storage subsystem for later use, shipment or transportation.

Referring now to FIG. 5E, another embodiment of a method of the present invention, generally 500, is shown to include a supplying step 502 of providing an input material comprising one or a plurality of source healthcare materials having a certain component make-up. The method 500 also includes a sizing or sizing and homogenizing step 506, where the input material is sized or sized and partially or completely homogenized to form a particulate burnable fuel. The method also includes a packaging step 510, where the particulate burnable fuel is packaged to form a packaged or containerized particulate burnable fuel. The method 500 also includes a burning step 504, where the packaged or containerized, particulate burnable fuel is burned to produce a cement clinker composition.

Referring now to FIG. 5F, another embodiment of a method of the present invention, generally 500, is shown to include a supplying step 502 of providing an input material comprising one or a plurality of source healthcare materials having a certain component make-up. The method 500 also includes a sizing or sizing and homogenizing step 506, where the input material is sized or sized and partially or completely homogenized to form a particulate burnable fuel. The method 500 also includes a shaping step 512, where the particulate burnable fuel is formed into a burnable compact shape for form a shaped burnable fuel. The shaping step 512 can be a pelletizing step, producing burnable fuel pellets, an extruding step, producing burnable extrudates, or any other step that forms the particular burnable fuel into a compact shape. The method 500 also includes a storing step 508, where the shaped burnable fuel is stored in a storage subsystem for later use, shipment or transportation.

Referring now to FIG. 5G, another embodiment of a method of the present invention, generally 500, is shown to include a supplying step 502 of providing an input material comprising one or a plurality of source healthcare materials having a certain component make-up. The method 500 also includes a sizing or sizing and homogenizing step 506, where the input material is sized or sized and partially or completely homogenized to form a particulate burnable fuel. The method 500 also includes a shaping step 512, where the particulate burnable fuel is formed into a burnable compact shape to form a shaped burnable fuel. The shaping step 512 can be a pelletizing step, producing burnable fuel pellets, an extruding step, producing burnable extrudates, or any other step that forms the particular burnable fuel into a compact shape. The method 500 also includes a burning step 504, where the shaped burnable fuel is burned to produce a cement clinker composition.

Referring now to FIG. 5H, another embodiment of a method of the present invention, generally 500, is shown to include a supplying step 502 of providing an input material comprising one or a plurality of source healthcare materials having a certain component make-up. The method also includes a sizing or sizing and homogenizing step 506, where the input material is sized or sized and partially or completely homogenized to form a particulate burnable fuel. The method 500 also includes a shaping step 512, where the particulate burnable fuel is formed into a burnable compact shape to form a shaped burnable fuel. The shaping step 512 can be a pelletizing step, producing burnable fuel pellets, an extruding step, producing burnable extrudates, or any other step that forms the particular burnable fuel into a compact shape. The method 500 also includes a packaging step 510, where the shaped burnable fuel is packaged to form a packaged or containerized shaped burnable fuel. The method 500 also includes a storing step 508, where the containerized shaped burnable fuel is stored in a storage subsystem for later use, shipment or transportation.

Referring now to FIG. 5I, another embodiment of a method of the present invention, generally 500, is shown to include a supplying step 502 of providing an input material comprising one or a plurality of source healthcare materials having a certain component make-up. The method also includes a sizing or sizing and homogenizing step 506, where the input material is sized or sized and partially or completely homogenized to form a particulate burnable fuel. The method 500 also includes a shaping step 512, where the particulate burnable fuel is formed into a burnable compact shape to form a shaped burnable fuel. The shaping step can be a pelletizing step, producing burnable fuel pellets, an extruding step, producing burnable extrudates, or any other step that forms the particular burnable fuel into a compact shape. The method 500 also includes a packaging step 510, where the shaped burnable fuel is packaged to form a packaged or containerized shaped burnable fuel. The method 500 also includes a burning step 504, where the packaged or containerized, shaped burnable fuel is burned to produce a cement clinker composition.

Basic with Methods with Pre-Processing or Pre-Treating

Referring now to FIG. 6A, an embodiment of a method of the present invention, generally 600, is shown to include a supplying step 602 of providing an input material comprising one or a plurality of source healthcare materials having a certain component make-up. The method 600 also includes a pre-treating step 604, where the input material is pre-treated to form a pre-treated material as a burnable fuel. The method 600 also includes a burning step 606, where the pre-treated material is burned to produce a cement clinker composition.

Referring now to FIG. 6B, another embodiment of a method of the present invention, generally 600, is shown to include a supplying step 602 of providing an input material comprising one or a plurality of source healthcare materials having a certain component make-up. The method 600 also includes a pre-treating step 604, where the input material is pre-treated to form a pre-treated material. The method 600 also includes a sizing or sizing and homogenizing step 608, where the pre-treated material is sized or sized and partially or completely homogenized to form a particulate burnable fuel. The method 600 also includes a storing step 610, where the burnable fuel is stored in a storage subsystem for later use, shipment or transportation.

Referring now to FIG. 6C, another embodiment of a method of the present invention, generally 600, is shown to include a supplying step 602 of providing an input material comprising one or a plurality of source healthcare materials having a certain component make-up. The method 600 also includes a pre-treating step 604, where the input material is pre-treated to form a pre-treated material. The method 600 also includes a sizing or sizing and homogenizing step 608, where the pre-treated material is sized or sized and partially or completely homogenized to form a particulate burnable fuel. The method 600 also includes a burning step 606, where the particulate burnable fuel is burned to produce a cement clinker composition.

Referring now to FIG. 6D, another embodiment of a method of the present invention, generally 600, is shown to include a supplying step 602 of providing an input material comprising one or a plurality of source healthcare materials having a certain component make-up. The method 600 also includes a pre-treating step 604, where the input material is pre-treated to form a pre-treated material. The method 600 also includes a sizing or sizing and homogenizing step 608, where the pre-treated material is sized or sized and partially or completely homogenized to form a particulate burnable fuel. The method 600 also includes a packaging step 612, where the particulate burnable fuel is packaged to form a packaged or containerized particular burnable fuel. The method 600 also includes a storing step 610, where the packaged or containerized particulate burnable fuel is stored in a storage subsystem for later use, shipment or transportation.

Referring now to FIG. 6E, another embodiment of a method of the present invention, generally 600, is shown to include a supplying step 602 of providing an input material comprising one or a plurality of source healthcare materials having a certain component make-up. The method 600 also includes a pre-treating step 604, where the input material is pre-treated to form a pre-treated material. The method 600 also includes a sizing or sizing and homogenizing step 608, where the pre-treated material is sized or sized and partially or completely homogenized to form a particulate burnable fuel. The method 600 also includes a packaging step 612, where the particulate burnable fuel is packaged to form a packaged or containerized particulate burnable fuel. The method 600 also includes a burning step 606, where the packaged or containerized, particulate burnable fuel is burned to produce a cement clinker composition.

Referring now to FIG. 6F, another embodiment of a method of the present invention, generally 600, is shown to include a supplying step 602 of providing an input material comprising one or a plurality of source healthcare materials having a certain component make-up. The method 600 also includes a pre-treating step 604, where the input material is pre-treated to form a pre-treated material. The method 600 also includes a sizing or sizing and homogenizing step 608, where the pre-treated material is sized or sized and partially or completely homogenized to form a particulate burnable fuel. The method 600 also includes a shaping step 614, where the particulate burnable fuel is formed into a burnable compact shape to form a shaped burnable fuel. The shaping step 614 can be a pelletizing step, producing burnable fuel pellets, an extruding step, producing burnable extrudates, or any other step that forms the particular burnable fuel into a compact shape. The method 600 also includes a storing step 610, where the shaped burnable fuel is stored in a storage subsystem for later use, shipment or transportation.

Referring now to FIG. 6G, another embodiment of a method of the present invention, generally 600, is shown to include a supplying step 602 of providing an input material comprising one or a plurality of source healthcare materials having a certain component make-up. The method 600 also includes a pre-treating step 604, where the input material is pre-treated to form a pre-treated material. The method 600 also includes a sizing or sizing and homogenizing step 608, where the pre-treated material is sized or sized and partially or completely homogenized to form a particulate burnable fuel. The method 600 also includes a shaping step 614, where the particulate burnable fuel is formed into a burnable compact shape to form a shaped burnable fuel. The shaping step 614 can be a pelletizing step, producing burnable fuel pellets, an extruding step, producing burnable extrudates, or any other step that forms the particular burnable fuel into a compact shape. The method 600 also includes a burning step 606, where the shaped burnable fuel is burned to produce a cement clinker composition.

Referring now to FIG. 6H, another embodiment of a method of the present invention, generally 600, is shown to include a supplying step 602 of providing an input material comprising one or a plurality of source healthcare materials having a certain component make-up. The method 600 also includes a pre-treating step 604, where the input material is pre-treated to form a pre-treated material. The method 600 also includes a sizing or sizing and homogenizing step 608, where the pre-treated material is sized or sized and partially or completely homogenized to form a particulate burnable fuel. The method 600 also includes a shaping step 614, where the particulate burnable fuel is formed into a burnable compact shape to form a shaped burnable fuel. The shaping step 614 can be a pelletizing step, producing burnable fuel pellets, an extruding step, producing burnable extrudates, or any other step that forms the particular burnable fuel into a compact shape. The method 600 also includes a packaging step 612, where the shaped burnable fuel is packaged to form a packaged or containerized shaped burnable fuel. The method 600 also includes a storing step 610, where the packaged shaped burnable fuel is stored in a storage subsystem for later use, shipment or transportation.

Referring now to FIG. 6I, another embodiment of a method of the present invention, generally 600, is shown to include a supplying step 602 of providing an input material comprising one or a plurality of source healthcare materials having a certain component make-up. The method 600 also includes a pre-treating step 604, where the input material is pre-treated to form a pre-treated material. The method 600 also includes a sizing or sizing and homogenizing step 608, where the pre-treated material is sized or sized and partially or completely homogenized to form a particulate burnable fuel. The method 600 also includes a shaping step 614, where the particulate burnable fuel is formed into a burnable compact shape to form a shaped burnable fuel. The shaping step 614 can be a pelletizing step, producing burnable fuel pellets, an extruding step, producing burnable extrudates, or any other step that forms the particular burnable fuel into a compact shape. The method 600 also includes a packaging step 612, where the shaped burnable fuel is packaged to form a packaged or containerized shaped burnable fuel. The method 600 also includes a burning step 606, where the packaged or containerized, shaped burnable fuel is burned to produce a cement clinker composition.

In each of the above methods, the particulate burnable fuel or the shaped burnable fuel can be subject to one or more pre-processing or pre-treating steps.

Basic Methods with Two Source Healthcare Materials

Referring now to FIG. 7A, an embodiment of a method of the present invention, generally 700, is shown to include a first supplying step 702 for providing a first input material comprising one or a plurality of source healthcare materials having a first component make-up. The method 700 also includes a second supplying step 704 for providing a second input material comprising one or a plurality of source healthcare materials having a second component make-up. The method 700 also includes a pre-treating step 706, where the second input material is pre-treated to form a pre-treated material. The method 700 also includes a burning step 708, where the first input material and the pre-processed material as a burnable fuel is burned to produce a cement clinker composition.

Referring now to FIG. 7B, another embodiment of a method of the present invention, generally 700, is shown to include a first supplying step 702 for providing a first input material comprising one or a plurality of source healthcare materials having a first component make-up. The method 700 also includes a second supplying step 704 for providing a second input material comprising one or a plurality of source healthcare materials having a second component make-up. The method 700 also includes a pre-treating step 706, where the second input material is pre-treated to form a pre-treated material. The method 700 also includes a sizing or sizing and homogenizing step 710, where the first input and the pre-treated materials are sized or sized and partially or completely homogenized to form a particulate burnable fuel. The method 700 also includes a storing step 712, where the particulate burnable fuel is stored in a storage subsystem for later use, shipment or transportation.

Referring now to FIG. 7C, another embodiment of a method of the present invention, generally 700, is shown to include a first supply step 702 for providing a first input material comprising one or a plurality of source healthcare materials having a first component make-up. The method 700 also includes a second supplying step 704 for providing a second input material comprising one or a plurality of source healthcare materials having a second component make-up. The method 700 also includes a pre-treating step 706, where the second input material is pre-treated to form a pre-treated material. The method 700 also includes a sizing or sizing and homogenizing step 710, where the first input and the pre-treated materials are sized or sized and partially or completely homogenized to form a particulate burnable fuel. The method 700 also includes a burning step 708, where the particulate burnable fuel is burned to produce a cement clinker composition.

Referring now to FIG. 7D, another embodiment of a method of the present invention, generally 700, is shown to include a first supply step 702 for providing a first input material comprising one or a plurality of source healthcare material having a first component make-up. The method 700 also includes a second supplying step 704 for providing a second input material comprising one or a plurality of source healthcare materials having a second component make-up. The method 700 also includes a pre-treating step 706, where the second input material is pre-treated to form a pre-treated material. The method 700 also includes a sizing or sizing and homogenizing step 710, where the first input and the pre-treated materials are sized or sized and partially or completely homogenized to form a particulate burnable fuel. The method 700 also includes a packaging step 714, where the particulate burnable fuel is packaged to form a packaged or containerized particulate burnable fuel. The method 700 also includes a storing step 712, where the packaged or containerized particulate burnable fuel is stored in a storage subsystem for later use, shipment or transportation.

Referring now to FIG. 7E, another embodiment of a method of the present invention, generally 700, is shown to include a first supply step 702 for providing a first input material comprising one or a plurality of source healthcare materials having a first component make-up. The method 700 also includes a second supplying step 704 for providing a second input material comprising one or a plurality of source healthcare materials having a second component make-up. The method 700 also includes a pre-treating step 706, where the second input material is pre-treated to form a pre-treated material. The method 700 also includes a sizing or sizing and homogenizing step 710, where the first input and the pre-treated materials are sized or sized and partially or completely homogenized to form a particulate burnable fuel. The method 700 also includes a packaging step 714, where the particulate burnable fuel is packaged to form a packaged or containerized particulate burnable fuel. The method 700 also includes a burning step 712, where the packaged or containerized particulate burnable fuel is burned to produce a cement clinker composition.

Referring now to FIG. 7F, another embodiment of a method of the present invention, generally 700, is shown to include a first supply step 702 for providing a first input material comprising one or a plurality of source healthcare materials having a first component make-up. The method 700 also includes a second supplying step 704 for providing a second input material comprising one or a plurality of source healthcare materials having a second component make-up. The method 700 also includes a pre-treating step 706, where the second input material is pre-treated to form a pre-treated material. The method 700 also includes a sizing or sizing and homogenizing step 710, where the first input and the pre-treated materials are sized or sized and partially or completely homogenized to form a particulate burnable fuel. The method 700 also includes a shaping step 716, where the particulate burnable fuel and optionally all or a portion of the ash are formed into a burnable compact shape to form a shaped burnable fuel. The shaping step 716 can be a pelletizing step, producing burnable fuel pellets, an extruding step, producing burnable extrudates, or any other step that forms the particular burnable fuel into a compact shape. The method 700 also includes a storing step 712, where the shaped burnable fuel is stored in a storage subsystem for later use, shipment or transportation.

Referring now to FIG. 7G, another embodiment of a method of the present invention, generally 700, is shown to include a first supply step 702 for providing a first input material comprising one or a plurality of source healthcare materials having a first component make-up. The method 700 also includes a second supplying step 704 for providing a second input material comprising one or a plurality of source healthcare materials having a second component make-up. The method 700 also includes a pre-treating step 706, where the second input material is pre-treated to form a pre-treated material. The method 700 also includes a sizing or sizing and homogenizing step 710, where the first input and the pre-treated materials are sized or sized and partially or completely homogenized to form a particulate burnable fuel. The method 700 also includes a shaping step 716, where the particulate burnable fuel is formed into a burnable compact shape to form a shaped burnable fuel. The shaping step 716 can be a pelletizing step, producing burnable fuel pellets, an extruding step, producing burnable extrudates, or any other step that forms the particulate burnable fuel into a compact shape. The method 700 also includes a burning step 708, where the shaped burnable fuel is burned to produce a cement clinker composition.

Referring now to FIG. 7H, another embodiment of a method of the present invention, generally 700, is shown to include a first supply step 702 for providing a first input material comprising one or a plurality of source healthcare materials having a first component make-up. The method 700 also includes a second supplying step 704 for providing a second input material comprising one or a plurality of source healthcare materials having a second component make-up. The method 700 also includes a pre-treating step 706, where the second input material is pre-treated to form a pre-treated material. The method 700 also includes a sizing or sizing and homogenizing step 710, where the first input and the pre-treated materials are sized or sized and partially or completely homogenized to form a particulate burnable fuel. The method 700 also includes a shaping step 716, where the particulate burnable fuel is formed into a burnable compact shape to form a shaped burnable fuel. The shaping step 716 can be a pelletizing step, producing burnable fuel pellets, an extruding step, producing burnable extrudates, or any other step that forms the particulate burnable fuel into a compact shape. The method 700 also includes a packaging step 714, where the shaped burnable fuel is packaged to form a packaged or containerized shaped burnable fuel. The method 700 also includes a storing step 712, where the packaged or containerized shaped burnable fuel is stored in a storage subsystem for later use, shipment or transportation.

Referring now to FIG. 7I, another embodiment of a method of the present invention, generally 700, is shown to include a first supply step 702 for providing a first input material comprising one or a plurality of source healthcare materials having a first component make-up. The method 700 also includes a second supplying step 704 for providing a second input material comprising one or a plurality of source healthcare materials having a second component make-up. The method 700 also includes a pre-treating step 706, where the second input material is pre-treated to form a pre-treated material. The method 700 also includes a sizing or sizing and homogenizing step 710, where the first input and the pre-treated materials are sized or sized and partially or completely homogenized to form a particulate burnable fuel. The method 700 also includes a shaping step 716, where the particulate burnable fuel is formed into a burnable compact shape to form a shaped burnable fuel. The shaping step 716 can be a pelletizing step, producing burnable fuel pellets, an extruding step, producing burnable extrudates, or any other step that forms the particular burnable fuel into a compact shape. The method 700 also includes a packaging step 714, where the shaped burnable fuel is packaged to form a packaged or containerized shaped burnable fuel. The method 700 also includes a burning step 708, where the packaged or containerize shaped burnable fuel is burned to produce a cement clinker composition.

In each of the above methods, the particulate burnable fuel or the shaped burnable fuel can be subject to one or more pre-processing or pre-treating steps.

EXPERIMENTS OF THE INVENTION

Example 1

The following data was obtained from a pilot plant facility, where used or waste material was pre-treated by disinfecting and shredded to form the particulate burnable fuel of the present invention.

Used or waste material was analyzed based on component makeup. The analysis revealed the component ranges set forth in Table I.

TABLE I

| Constituent List and Ranges | | | |
| --- | --- | --- | --- |
| | % Range | | |
| Constituent | Low | High | % Typical |
| Plastic | 50 | 100 | 70 |
| Cardboard | 15 | 100 | 29 |
| Stainless Steel | 0 | 5 | 1 |

Example 2

The following data was obtained from a pilot plant facility, where used or waste material was disinfected and shredded to form a burnable fuel and an ash obtained from burning of other used or waste material were burned and the resulting ash analyzed.

Disinfected shredded samples were received in 2.5 gallon buckets and were non-homogeneous at the one gram sub-sample size. Samples were shredded for particle size reduction. Coarsely milled and finely milled sample splits were returned and showed some inhomogeneity. The more finely milled sample split was utilized for all analyses.

Due to sample inhomogeneity, all analyses were performed multiple times (duplicate minimum) and values reported as represent "best value" averages. All data were reported on a finely milled sample weight basis.

Samples were stage ashed to 750° C. and held at temperature for 8 hours for ash percentage determination. After weighing, ash residues were fused with lithium metaborate for ash component analyses.

Metals except for mercury were determined by ICP-AES and ICP-MS after total sample decomposition with mixed acids including hydrofluoric acid or by high temperature fusion of sample ash with lithium metaborate. Mercury was determined by combustion/amalgamation cold vapor atomic absorption.

Bromide, chloride, nitrate, sulfate, and ortho-phosphate were measured by ion chromatography on washings from oxygen bomb combustion, and do not necessarily represent elements in these oxidation states prior to combustion.

Higher heating value is the gross calorific content and has not been corrected for possible sulfur content according to ASTM D5865.

The incinerated ash had a BTU/lb value of 5321 (12,377 MJ/kg) resulting in a 49 wt. % residue after burning at 750° C. The resulting ash had an elemental analysis tabulated in TABLE II.

TABLE II

Element Analysis of Ash in μg/g

| Br⁻ | Cl⁻ | NO₃⁻ | SO₄²⁻ | o-PO₄³⁻ | Ag | Al |
|---|---|---|---|---|---|---|
| 60 | 1730 | 440 | 2840 | <20 | 26 | 36500 |
| As | Ba | Be | Cd | Ca | Co | Cr |
| 3.6 | 6000 | 0.7 | 1.5 | 23600 | 24 | 1060 |
| Cu | Fe | Pb | Mg | Mn | Hg | Ni |
| 450 | 12100 | 162 | 7800 | 340 | 0.12 | 500 |
| K | Si | Na | Tl | Ti | Zn | |
| 5370 | 119000 | 16700 | 0.04 | 5560 | 4390 | |

The particulate burnable fuel had a BTU/lb value of 16400 (38,150 MJ/kg) resulting in a 5.6 wt. % residue after burning at 750° C. The resulting ash had an elemental analysis tabulated in TABLE III.

TABLE III

Element Analysis of Ash in μg/g

| Br⁻ | Cl⁻ | NO₃⁻ | SO₄²⁻ | o-PO₄³⁻ | Ag | Al | As | Ba |
|---|---|---|---|---|---|---|---|---|
| <20 | 240 | 71000 | 1400 | <20 | 78 | 2420 | 1.6 | 710 |
| Be | Cd | Ca | Co | Cr | Cu | Fe | Pb | Mg |
| 0.1 | 0.1 | 1950 | 33 | 4700 | 110 | 33400 | 24 | 210 |
| Mn | Hg | Ni | K | Si | Na | Tl | Ti | Zn |
| 580 | 0.06 | 2870 | 560 | 5610 | 1280 | <0.01 | 1520 | 330 |

Example 3

A used or waste material was obtained, disinfected, shredded and pelletized.

Referring to FIG. 8, a photograph of the particulate burnable fuel is shown comprising particles between about 19.05 mm and about 38.1 mm. The particulate burnable fuel had a bulk density between about 12lb/ft³ (0.19 g/cm³) and about 15lb/ft³ (0.24 g/cm³). The particulate burnable fuel can have a greater or lower density depending on composition and/or processing.

Referring to FIG. 9, the burnable fuel of FIG. 8 was pelletized to form shaped substantially cylindrical shapes. The shapes have a diameter between about 10 mm and about 15 mm and a length between 3 cm and about 5 cm. The shapes are shown here to be cracked with jagged ends. The shaped burnable fuel has a bulk density of 20 lb/ft³ (0.32 g/cm³) and about 30 lb/ft³ (0.48 g/cm³). The shaped burnable fuel can have a greater or lower density depending on composition and/or processing.

Referring to FIG. 10, a photograph of a source of used healthcare materials is shown. The material consists of boxes that would be delivered to a turnable fuel supply subsystem for used directly as a fuel or as a source material for processing into an input material, a pre-processed material, a particulate burnable fuel, and/or a shaped burnable fuel.

Referring to FIG. 11, a photograph of a pre-processed, here disinfected, materials is shown. The material consists of plastic containers manufactured by Sharps Compliance, Inc. of Houston, Tex., filled partially or completely with used healthcare materials including metal materials that have been autoclaved to disinfected the used healthcare materials contained therein. The pre-processed material can be used directly as a fuel or can shredded or shredded and shaped to form a particulate burnable fuel and/or a shaped burnable fuel.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for making a cement comprising:
providing one or a plurality of healthcare materials to a burnable fuel supply subsystem of an integrated cement production system to form a burnable fuel, where the healthcare materials include a complex mixture of components including metal materials or metallic materials selected from the group consisting of aluminum, aluminum alloys, iron, iron alloys, nickel, nickel alloys, tin, tin alloys, copper, copper alloys, and mixtures or combinations thereof, and where the burnable fuel includes from about 1 wt. % to about 10 wt. % the metal materials or metallic materials;
feeding the burnable fuel to a kiln subsystem of the cement production system; and
combusting the burnable fuel in the kiln subsystem of the cement production system, where the burnable fuel provides heat and ash, where the ash combines with cement raw materials to form a cement clinker composition.

2. The method of claim 1, further comprising:
prior to feeding, sizing or sizing and partially or completely homogenizing the burnable fuel, where the burnable fuel comprises a particulate burnable fuel having a particle size distribution having a smallest dimension of about 1 mm.

3. The method of claim 2, further comprising:
packaging the burnable fuel to form a containerized burnable fuel.

4. The method of claim 2, further comprising:
shaping the burnable fuel, where the burnable fuel comprises a shaped burnable fuel.

5. The method of claim 4, further comprising:
packaging the burnable fuel, where the burnable fuel comprises a containerized shaped burnable fuel.

6. The method of claim 1, further comprising:
prior to feeding, pre-treating the burnable fuel, where the burnable fuel comprises a pre-treated burnable fuel.

7. The method of claim 6, further comprising:
prior to or after pre-treating, sizing or sizing and partially or completely homogenizing the burnable fuel, where the burnable fuel comprises a particulate burnable fuel having a particle size distribution having a smallest dimension of about 1 mm.

8. The method of claim 7, further comprising:
shaping the burnable fuel, where the burnable fuel comprises a shaped burnable fuel.

9. The method of claim 8, further comprising:
packaging the burnable fuel, where the burnable fuel comprises a containerized shaped burnable fuel.

10. The method of claim 1, wherein the components further comprising pulp materials, polymer materials, fiber materials, fabric materials, and mixtures or combinations thereof.

11. The method of claim 1, wherein the healthcare materials comprise used or waste healthcare materials and optional virgin or unused healthcare materials.

12. The method of claim 11, wherein the used or waste healthcare material is contained in a closed receptacle, delivered either through the mail or via other delivery agencies to the burnable fuel supply subsystem.

13. The method of claim 10, wherein the components further comprise other materials including ceramic materials, ash materials, ash, or mixtures and combinations thereof.

14. The method of claim 1, wherein the metal materials or metallic materials are selected from the group consisting of an iron alloy and mixtures or combinations of iron alloys.

15. The method of claim 10, wherein the healthcare materials includes from about 20 wt. % to about 100 wt. % polymer materials, from about 0 wt. % to about 100 wt. % of pulp materials, and from 1 wt. % to 5 wt. % metal materials.

16. The method of claim 13, wherein the healthcare materials includes from about 20 wt. % to about 100 wt. % polymer materials, from about 0 wt. % to about 100 wt. % of pulp materials, and from about 0 wt. % to about 50 wt. % other materials.

17. The method of claim 13, wherein the healthcare materials includes from about 0 wt. % to about 100 wt. % polymer materials, from about 10 wt. % to about 100 wt. % of pulp materials, from 1 wt. % to 5 wt. % metal materials, from about 5 wt. % to about 100 wt. % other materials, and from about 0 wt. % to about 40 wt. % of a binding agent.

18. The method of claim 6, wherein the pre-treating is disinfecting, and the disinfecting is performed at a temperature greater than at least 121° C., at a pressure of at least 15 psig and for a time of at least 30 minutes.

19. The method of claim 2, wherein the particles have a smallest dimension of between about 1.00 mm and about 100 mm.

20. The method of claim 2, wherein the particles have a smallest dimension between about 19.05 mm and about 25.4 mm.

21. The method of claim 4, where the shape is an elongate shape having a diameter between about 5 mm and about 20 mm and length of about 2 cm to about 10 cm.

22. The method of claim 4, wherein the elongate shape is a cylindrical shape or substantially cylindrical shape.

23. The method of claim 4, wherein the shape is an elongate shape having a diameter between about 10 mm and about 20 mm and a length between 3 cm and about 5 cm.

24. The method of claim 4, wherein the shape is an elongate shape having a diameter between about 10 mm and about 15 mm and a length between 3 cm and about 5 cm.

25. The method of claim 1, wherein the burnable fuel supply subsystem and the kiln subsystem form a part of the integrated cement production system.

\* \* \* \* \*